(12) United States Patent
 Yoshimi

(10) Patent No.: US 11,188,768 B2
(45) Date of Patent: Nov. 30, 2021

(54) OBJECT DETECTION APPARATUS, OBJECT DETECTION METHOD, AND COMPUTER READABLE RECORDING MEDIUM

(71) Applicant: NEC Corporation, Tokyo (JP)

(72) Inventor: Kosuke Yoshimi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 162 days.

(21) Appl. No.: 16/625,136

(22) PCT Filed: Jun. 23, 2017

(86) PCT No.: PCT/JP2017/023311
§ 371 (c)(1),
(2) Date: Dec. 20, 2019

(87) PCT Pub. No.: WO2018/235300
PCT Pub. Date: Dec. 27, 2018

(65) Prior Publication Data
US 2021/0326608 A1 Oct. 21, 2021

(51) Int. Cl.
*G06T 5/00* (2006.01)
*G06K 9/00* (2006.01)
(Continued)

(52) U.S. Cl.
CPC .......... *G06K 9/00805* (2013.01); *G06T 5/006* (2013.01); *G06T 7/20* (2013.01); *G06T 7/70* (2017.01); *G06T 2207/30261* (2013.01)

(58) Field of Classification Search
CPC ......... G06K 9/00805; G06T 7/20; G06T 7/70; G06T 5/006; G06T 2207/30261
See application file for complete search history.

(56) References Cited

U.S. PATENT DOCUMENTS 7,058,237 B2 * 6/2006 Liu .................. G06T 5/006
  382/276
8,971,666 B2 * 3/2015 Yu .................... G06T 5/006
  382/293

(Continued)

FOREIGN PATENT DOCUMENTS

JP     2000-242773 A     9/2000
JP     4449618 B2        4/2010
(Continued)

OTHER PUBLICATIONS

English translation of Written opinion for PCT Application No. PCT/JP2017/023311.
(Continued)

*Primary Examiner* — Carol Wang
(74) *Attorney, Agent, or Firm* — Sughrue Mion, PLLC

(57) ABSTRACT

An object detection apparatus 100 is an apparatus for detecting an object in a fish-eye image. The object detection apparatus 100 includes a normalized image acquisition unit 10 configured to acquire a normalized image obtained by normalizing a fish-eye image in which an object appears; a position detecting unit 20 configured to detect position coordinates of the object in the normalized image; and a determination unit 30 configured to determine a positional relationship between the object and the object detection apparatus 100 using the position coordinates of the object in the normalized image.

12 Claims, 13 Drawing Sheets

(51) Int. Cl.
      *G06T 7/70*          (2017.01)
      *G06T 7/20*          (2017.01)

(56) References Cited

U.S. PATENT DOCUMENTS

| | | | |
|---|---|---|---|
| 10,984,275 B1* | 4/2021 | Campbell | G06K 9/3258 |
| 2005/0151837 A1* | 7/2005 | Cutler | G06T 3/0062 |
| | | | 348/36 |
| 2005/0180656 A1* | 8/2005 | Liu | G06T 3/0062 |
| | | | 382/284 |
| 2005/0259118 A1* | 11/2005 | Mojaver | H04N 5/2628 |
| | | | 345/647 |
| 2007/0211955 A1* | 9/2007 | Pan | H04N 5/23238 |
| | | | 382/254 |
| 2013/0162826 A1 | 6/2013 | Zhang et al. | |
| 2017/0140229 A1 | 5/2017 | Ogata et al. | |

FOREIGN PATENT DOCUMENTS

| JP | 2013-137767 A | 7/2013 |
|---|---|---|
| JP | 2014-071496 A | 4/2014 |
| JP | 2016-134764 A | 7/2016 |

OTHER PUBLICATIONS

International Search Report for PCT Application No. PCT/JP2017/023311, dated Sep. 5, 2017.

* cited by examiner $I_H$: NORMALIZED IMAGE PLANE $(u_H, v_H)$

REAL SPACE ROAD PLANE $(\theta, r)$

OBJECT DETECTION APPARATUS, OBJECT DETECTION METHOD, AND COMPUTER READABLE RECORDING MEDIUM

This application is a National Stage Entry of PCT/JP2017/023311 filed on Jun. 23, 2017, the contents of all of which are incorporated herein by reference, in their entirety.

TECHNICAL FIELD

The present invention relates to an object detection apparatus and an object detection method for detecting an object using a fish-eye image, and a computer readable recording medium that includes a program for realizing the same recorded thereon.

BACKGROUND ART

In recent years, a moving body detection system that uses an in-vehicle camera has been proposed for the purpose of safety assistance when a vehicle parks (e.g. see Patent Document 1). The moving body detection system is a system that detects moving bodies, such as other vehicles or pedestrians, based on a video obtained by the in-vehicle camera, which is attached to a rear part of the vehicle, a vehicle peripheral portion, or the like. Also, in this kind of object detection system, a fish-eye camera is used as an in-vehicle camera in order to obtain a field of view with a small dead angle at low cost.

Specifically, a moving body detection system disclosed in Patent Document 1 is a system that detects a moving body around a stopped vehicle. The object detection system detects a region where an object is present, as moving region pixels, in an image obtained by the fish-eye camera, translucently colors the detected moving region pixels, and displays the colored moving region pixels on a screen. Thus, a driver of the vehicle can recognize the presence of the moving body.

Furthermore, if a moving body approaches the vehicle, the image of the moving body increases in size and the number of colored moving region pixels increases accordingly. Using this configuration, the moving body detection system disclosed in Patent Document 1 warns the driver about the moving body approaching if the number of moving body region pixels exceeds a threshold.

LIST OF PRIOR ART DOCUMENTS

Patent Document

Patent Document 1: Japanese Patent No. 4449618

DISCLOSURE OF THE INVENTION

Problems to be Solved by the Invention

However, when a moving body such as a pedestrian is detected using a fish-eye camera installed in a rear part or the like of a vehicle, it is difficult to perform appropriate detection in accordance with the actual distance to the approaching moving body and the actual moving speed of the moving body, due to distortion present in a fish-eye camera.

Specifically, in the moving body detection system disclosed in Patent Document 1, an approach of a moving body is determined depending on the size of the moving body in the fish-eye image, and this determination is not performed accurately in correspondence with the actual distance to the approaching moving body and the actual moving speed. In particular, since a subject in a peripheral portion of a fish-eye image relative to the optical axis of the camera appears to be smaller, it is possible in the moving body detection system disclosed in Patent Document 1 that the risk in the determination of an approach in a moving body is estimated to be lower.

For this reason, in a system in which object detection is performed based on the size of a target object in a fish-eye image, as in the moving body detection system disclosed in Patent Document 1, it is also difficult to detect a pedestrian or the like who is about to go from a side around to the rear of the vehicle. In addition, detection of a pedestrian or the like who is about to go from a side around to the rear of the vehicle is especially important for the purpose of assisting in safety driving of the vehicle, and reliable detection is desired.

An example object of the invention is to solve the foregoing problem, and provide an object detection apparatus, an object detection method, and a computer readable recording medium with which object detection accuracy is improved in the case of using a fish-eye optical system.

Means for Solving the Problems

To achieve the above-stated example object, an object detection apparatus according to an example aspect of the invention is an object detection apparatus for detecting an object in a fish-eye image, the apparatus including:

a normalized image acquisition unit configured to acquire a normalized image obtained by normalizing a fish-eye image in which an object appears;

a position detecting unit configured to detect position coordinates of the object in the normalized image; and a determination unit configured to determine a positional relationship between the object and the apparatus, using the position coordinates of the object in the normalized image.

Also, to achieve the above-stated object, an object detection method according to an example aspect of the invention is an object detection method for detecting an object in a fish-eye image, the method including:

(a) a step of acquiring a normalized image obtained by normalizing a fish-eye image in which an object appears;

(b) a step of detecting position coordinates of the object in the normalized image; and (c) a step of determining a positional relationship with the object, using the position coordinates of the object in the normalized image.

Furthermore, to achieve the above-stated object, a non-transitory computer readable recording medium according to an example aspect of the invention is a computer readable recording medium that includes a program recorded thereon, the program being for detecting an object in a fish-eye image using a computer and including instructions that cause the computer to carry out:

(a) a step of acquiring a normalized image obtained by normalizing a fish-eye image in which an object appears;

(b) a step of detecting position coordinates of the object in the normalized image; and (c) a step of determining a positional relationship with the object, using the position coordinates of the object in the normalized image.

Advantageous Effects of the Invention

As described above, according to the invention, object detection accuracy can be improved in the case of using a fish-eye optical system.

MODE FOR CARRYING OUT THE INVENTION

Example Embodiment

Figure 1:
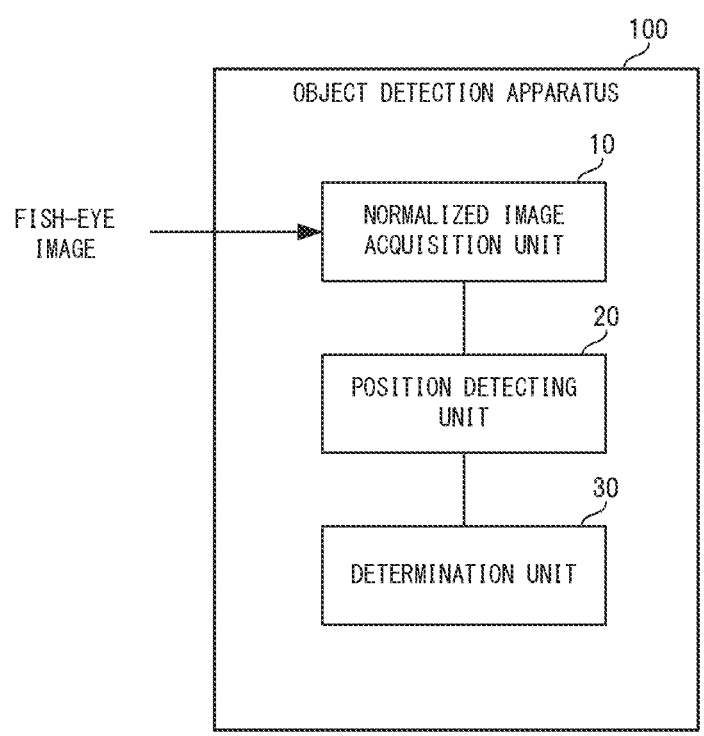
FIG. 1 is a block diagram that shows a schematic configuration of an object detection apparatus according to an example embodiment of the invention.

Hereinafter, an object detection apparatus, an object detection method, and a program according to an example embodiment of the invention will be described with reference to FIGS. 1 to 13.
Apparatus Configuration First, a schematic configuration of the object detection apparatus according to this example embodiment will be described with reference to FIG. 1. FIG. 1 is a block diagram that shows the schematic configuration of the object detection apparatus according to the example embodiment of the invention.

An object detection apparatus 100 according to this example embodiment shown in FIG. 1 is an apparatus for detecting objects in a fish-eye image. As shown in FIG. 1, the object detection apparatus 100 includes a normalized image acquisition unit 10, a position detecting unit 20, and a determination unit 30.

The normalized image acquisition unit 10 acquires a normalized image, which is obtained by normalizing a fish-eye image in which an object appears. The position detecting unit 20 detects the position coordinates of the object in the normalized image. The determination unit 30 determines a positional relationship between the object and the object detection apparatus 100 using the position coordinates of the object in the normalized image.

Thus, in this example embodiment, object detection is performed using a normalized image obtained by normalizing a fish-eye image. For this reason, according to this example embodiment, improvement in object detection accuracy can be achieved in the case of using a fish-eye optical system.

Figure 2:
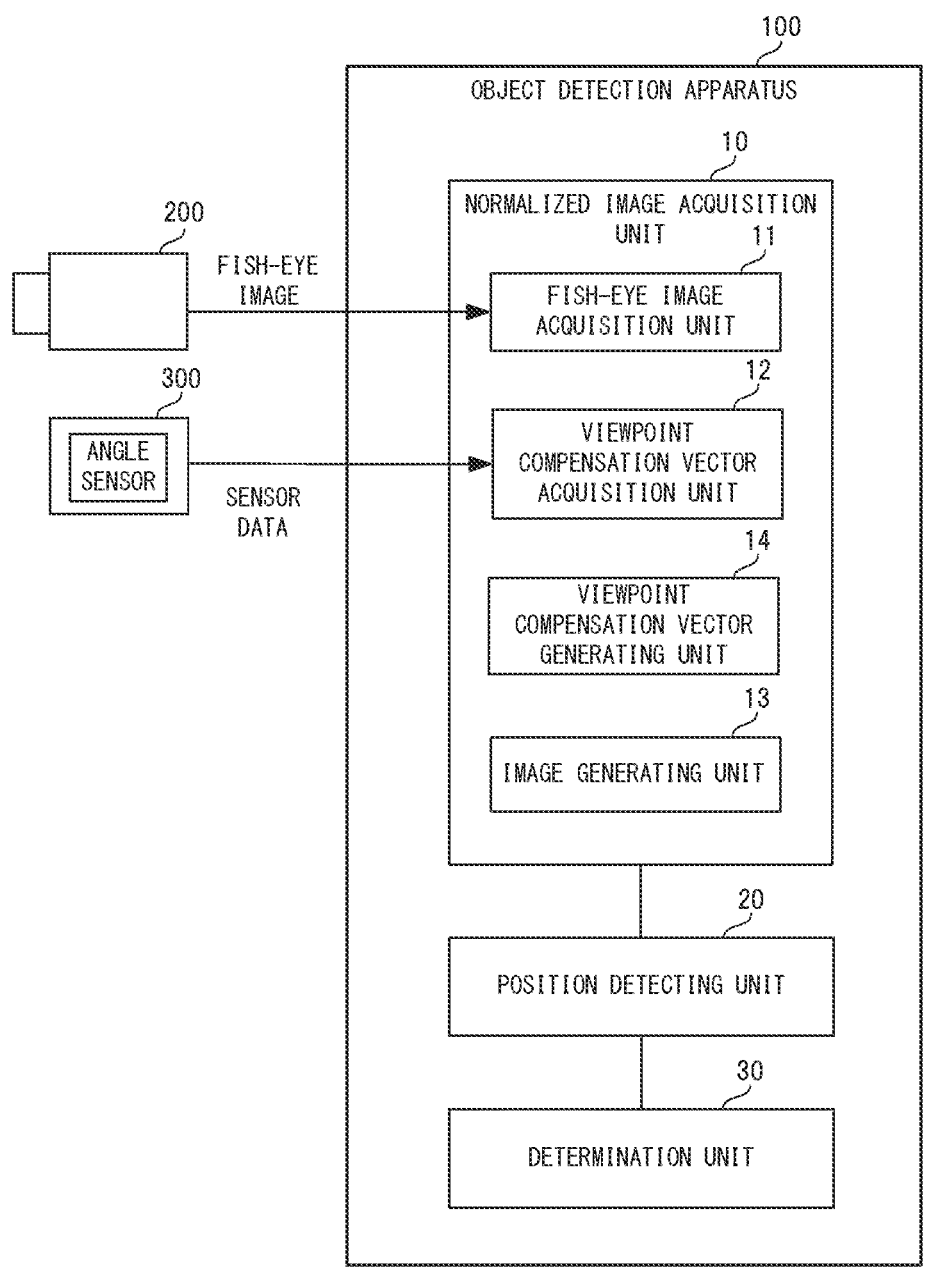
FIG. 2 is a block diagram that shows the configuration of the object detection apparatus according to the example embodiment of the invention in more detail.

Next, the configuration of the object detection apparatus 100 according to this example embodiment will be described in more detail with reference to FIGS. 2 to 4. FIG. 2 is a block diagram that shows a configuration of the object detection apparatus according to the example embodiment of the invention in more detail.

As shown in FIG. 2, in this example embodiment, the object detection apparatus 100 is connected to an image output device 200 and a sensor device 300. Also, in this example embodiment, the object detection apparatus 100 is mounted in a vehicle.

The image output device 200 is a device that outputs image data to the normalized image acquisition unit 10. In the example in FIG. 2, an imaging device is used as the image output device 200. The imaging device is a device that performs imaging in real time, and continuously outputs image data regarding an object. Specific examples of the imaging device may include, for example, a camcorder that outputs images in the NTSC (National Television Standards Committee) format or the PAL (Phase Alternating Line) format, or various kinds of digital images.

In this example embodiment, the image output device 200 outputs, as the image data, fish-eye image data. Accordingly, an example of an optical system used in the imaging device may be a fish-eye lens system. An example of the imaging device may be a fish-eye camera that includes a fish-eye lens and an image sensor.

The image output device 200 may alternatively be a device other than an imaging device, e.g. may be an image capture device. The image capture device reads out image information stored in a storage medium, converts the read image information into the NTSC format, the PAL format, or any image format that can be read by other electronic control devices, and outputs the converted image information. In this case, the image output device 200 may also be realized as a software program that operates on a computer that constitutes the object detection apparatus 100. Note that the computer that constitutes the object detection apparatus 100 will be described later. The computer performs image processing based on a predetermined program, in accordance with image information that is sent from the image output device 200.

In this example embodiment, the normalized image acquisition unit 10 acquires the fish-eye image data that is output by the image output device 200, and acquires a normalized image by performing normalization processing on the acquired fish-eye image data. For this purpose, the normalized image acquisition unit 10 includes a fish-eye image acquisition unit 11, a viewpoint compensation vector acquisition unit 12, an image generating unit 13, and a viewpoint compensation vector generating unit 14, as shown in FIG. 2. Note that, in this example embodiment, the normalized image acquisition unit 10 may also be configured to sequentially acquire stored data regarding normalized images that are externally generated in advance.

The fish-eye image acquisition unit 11 acquires a fish-eye image in which a target object appears. The viewpoint compensation vector acquisition unit 12 acquires a viewpoint compensation vector, which is generated by the viewpoint compensation vector generating unit 14. A viewpoint compensation vector is a vector for converting a fish-eye image to an image that is obtained by shooting a target object from a direction parallel to a ground plane, based on a roll angle of the imaging device around the optical axis thereof and a pitch angle of the optical axis, with a plane parallel to the ground plane of the target object serving as a reference.

The viewpoint compensation vector generating unit 14 acquires, from the sensor device 300, the roll angle of an image input device 200, which is an imaging device, around the optical axis thereof, and the pitch angle of the optical axis, and generates a viewpoint compensation vector based on the acquired roll angle and pitch angle.

The sensor device 300 is attached to the image input device 200, which is an imaging device. The sensor device 300 includes an angle sensor, for example, and outputs information for measuring the relative vector between an optical axis vector of the imaging device and a vector parallel to the ground plane of an object that is a subject imaged. Examples of the output information may include the roll angle of the imaging device around the optical axis thereof, the pitch angle of the optical axis, and the yaw angle of the optical axis (see FIG. 6, which will be described later).

If the ground plane (target plane) of an object is assumed to be a horizontal plane (ground surface), the sensor device 300 outputs a difference from an initial value, which is a value obtained when the optical axis of the imaging device is parallel to the horizontal direction and the tilt of the imaging device is zero (i.e. in a state where the horizontal direction of the imaging device is parallel to the horizontal plane).

On the other hand, if the ground plane of the target object is not a horizontal plane (ground surface), the sensor device 300 outputs a difference from the aforementioned initial value, while giving consideration to the pre-measured angle of the ground plane of the target relative to the horizontal plane. Also, a sensor device (angle sensor) for measuring the angle of a target object relative to the ground plane may be installed separately from the sensor device 300, and, in this case, the sensor device 300 outputs a difference between the sensor data obtained by itself and sensor data from the other sensor device.

If the image output device 200 is the aforementioned image capture device, information regarding the angle sensor is also created in advance, and the information regarding the angle sensor is provided from a storage device that stores this information synchronously with images. Note that the information regarding the angle sensor in this case may include the roll angle, around the optical axis, of the imaging device that outputs image information that is to be read out, the pitch angle of the optical axis, and the yaw angle of the optical axis.

In this example embodiment, software for calculating the relative vector may be used in place of the sensor device 300. In this case, a difference vector of a target object relative to the ground plane is estimated based on the position and shape of a reference object in an image, for example, by the software. Note that, if it can be expected that the relative relationship between the optical axis vector of the imaging device and the ground plane of a target object will not change during imaging, data that is measured in advance and defines the aforementioned relative relationship may be used in place of this software.

The image generating unit 13 initially sets, for a fish-eye image that has been transformed using a viewpoint compensation vector, a plurality of viewpoints parallel to the ground plane of a target object, along the horizontal direction of the fish-eye image. Then, the image generating unit 13 performs, for each of the set viewpoints, distortion correction for the transformed fish-eye image using perspective projection approximation based on a coordinate system that includes a line of sight from each of the set viewpoints as an axis. The image generating unit 13 then generates a single normalized image using image elements in the vertical direction that are extracted from the distortion-corrected fish-eye images.

Since transform using the viewpoint compensation vector is thus performed in this example embodiment, distortion in a fish-eye image can be normalized even if the positional relationship between the optical axis of the fish-eye camera and the plane in which a target object comes into contact with the ground does not satisfy a certain condition. Also, in this example embodiment, distortion correction is performed for each of the plurality of coordinate systems, and an image that has been corrected while changing the viewpoint is obtained. The elements of the obtained corrected images in the vertical direction are connected to obtain an ultimate normalized image. Due to this configuration, in this example embodiment, the fish-eye optical system is not affected even if the design model thereof is not open to the public, and distortion can be removed.

In this example embodiment, the position detecting unit 20 detects an image region of an object in the normalized image based on pixel data on the normalized image, and detects the coordinates of the position at which the detected image region and the ground surface intersect each other, as the object position coordinates. Specifically, the position detecting unit 20 detects an image region of an object, such as a person or a vehicle, for example, in image data regarding the normalized image, using a common statistical object detection method of identifying an object based on image features, and detects the position coordinates of the lowermost point of the detected image region.

The position detecting unit 20 can also detect the image region of an object and detect the position coordinates in image data regarding a pre-normalization image. In this case, the position detecting unit 20 transforms the detected position coordinates to coordinates in a coordinate system on a normalized image. Furthermore, the position detecting unit 20 can also detect an object and detect the position coordinates based on information from an external sensor, such as a laser sensor, for example. In this case as well, the position detecting unit 20 transforms the detected position coordinates to coordinates in a coordinate system on a normalized image.

Figure 3A:
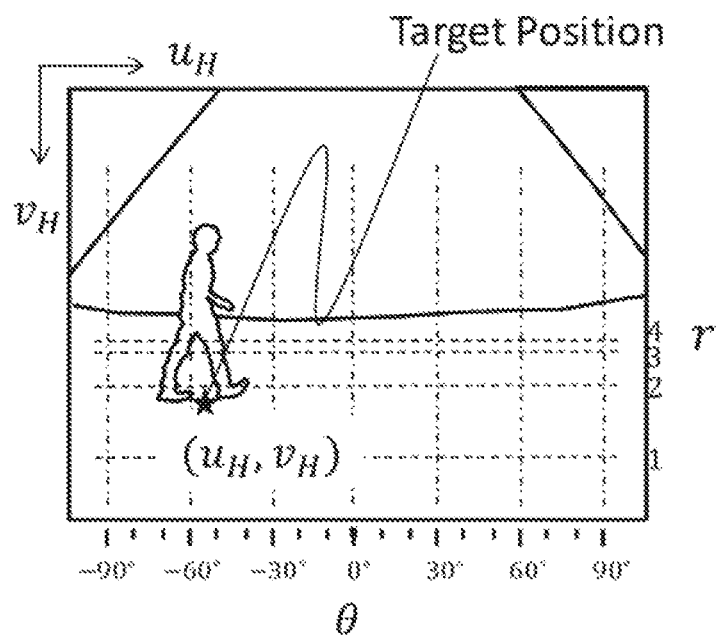
FIG. 3a shows an example of a normalized image that is used in the example embodiment of the invention.
Figure 3B:
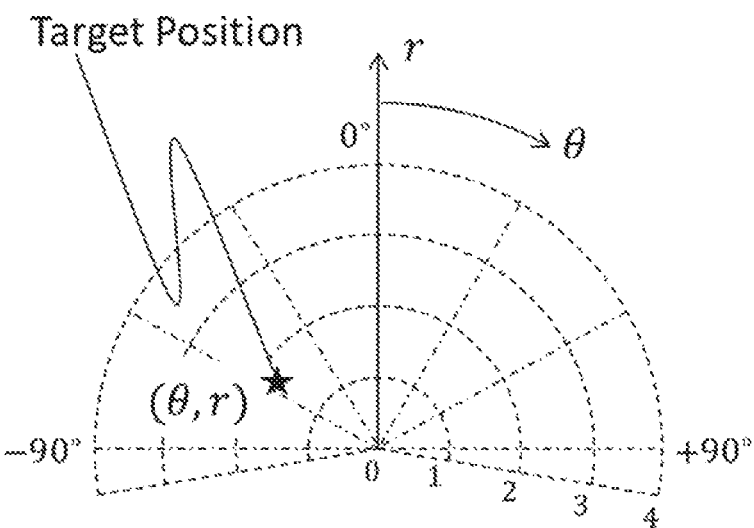
FIG. 3b shows an example of a real space coordinate system that is used in the example embodiment of the invention.
Figure 4:
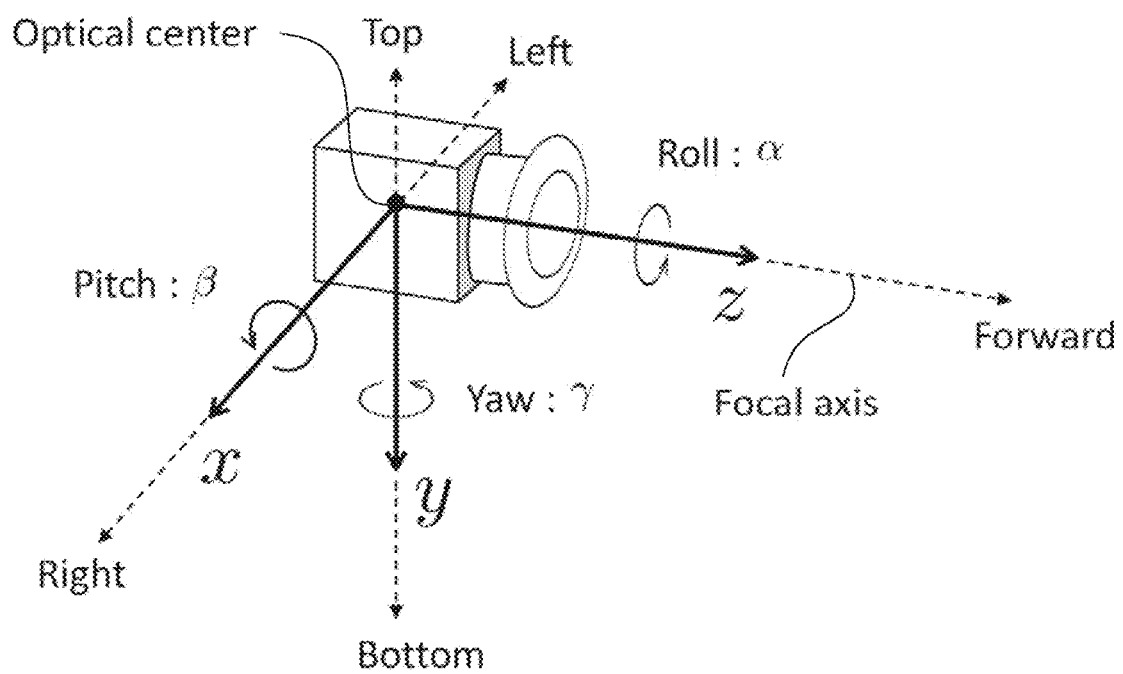
FIG. 4 shows a definition of a coordinate system of an imaging device that is used in the example embodiment of the invention.

In this example embodiment, the determination unit 30 transforms the position coordinates of the object in the normalized image to coordinates in a coordinate system (which will be hereinafter referred to as "real space coordinate system") in which position coordinates are defined by the distance r of the object to the vehicle and the tilt angle θ of the object relative to the optical axis of the imaging device, as shown in FIG. 3. FIG. 3a shows an example of a normalized image that is used in the example embodiment of the invention, and FIG. 3b shows an example of a real space coordinate system that is used in the example embodiment of the invention.

As shown in FIGS. 3(a) and 3(b), the position coordinates in a normalized image and the position coordinates in a real space coordinate system are associated with each other by Formulas 1 and 2 below, by definition of the normalized image.

$$\theta = A_X \left( \frac{u_H}{W_0} - 0.5 \right) \quad \text{[Formula 1]}$$

$$r = H_C \left( \frac{\frac{H_0}{2}}{\left( v_H - \frac{H_0}{2} \right) * \tan \frac{A_Y}{2}} \right) \quad \text{[Formula 2]}$$

The definition of parameters used in Formulas 1 and 2 above is as follows, as shown in FIGS. 3(a) and 3(b).
($u_H$, $v_H$): Position coordinates in normalized image,
($\theta$, r): Position coordinates in real space coordinate system
$A_X$: Horizontal angle of view
$A_Y$: Vertical angle of view
$W_O \times H_O$: Normalized image size
$H_C$: Camera installation height The position coordinates ($\theta$, r) in the real space coordinate system express the position on the ground surface in the real space using polar coordinates, as shown in FIG. 3b, and indicate the relative angle ($\theta$) and distance (r) of the object relative to a reference position of the vehicle system.

In this example embodiment, the transform processing of position coordinates may be performed by the determination unit through calculation when necessary, or may be performed using a look up table (LUT) that is created in advance and indicates a correspondence relationship between position coordinates.

Next, the determination unit 30 obtains a time-series change in the transformed position coordinates of the object. Specifically, the determination unit 30 calculates, as time-average rates of change, a rate of change of the distance r of the object to the vehicle (which will be hereinafter referred to as "distance-speed"), and a rate of change in the tilt angle $\theta$ of the object (which will be hereinafter referred to as "angular speed"). Values smoothed by the Kalman filter or the like may be used as the distance-speed and the angular speed. Furthermore, the tilt angle, the distance, the angular speed, and the distance-speed at time t are expressed as Formula 3 below.

$$\left( \theta_t, r_t, \frac{d\theta}{dt} = \dot{\theta}, \frac{dr}{dt} = \dot{r} \right) \quad \text{[Formula 3]}$$

Next, the determination unit 30 determines a positional relationship between the object and the vehicle based on the time-series change in the transformed position coordinates of the object. Specifically, the determination unit 30 determines whether the object is in a state of moving around toward the vehicle, a state of having crossed in front of the vehicle, or a state of approaching the vehicle, based on the angular speed and the distance-speed. Specific determination criteria in this determination are as follows.

(1) Moving Around Toward Vehicle
If, as indicated by Formula 4 below, the absolute value |dr/dt| of the distance-speed is smaller than a threshold $\delta$ (>0), the tilt angle $\theta$ is changing while approaching 0, and the angular speed d$\theta$/dt exceeds a threshold $\varepsilon$ (>0), the determination unit 30 determines that the object is moving around toward the vehicle.

$|\dot{r}|<\delta(>0)$, and $\dot{\theta}<-\varepsilon$ (if $\theta>0$), $\dot{\theta}>\varepsilon$ (otherwise) [Formula 4]

(2) Crossing
If, as indicated by Formula 5 below, the negative value of the distance-speed (i.e. the approaching speed in the distance-direction) is in the range from the threshold $\delta$ (>0) to $\eta$ (>$\delta$>0), the tilt angle $\theta$ is changing while approaching 0, and the angular speed d$\theta$/dt exceeds the threshold $\varepsilon$ (>0), the determination unit 30 determines that the vehicle is crossing in front of the vehicle.

$\eta \geq -\dot{r} \geq \delta(>0)$, and $\dot{\theta}<-\varepsilon$ (if $\theta>0$), $\dot{\theta}>\varepsilon$ (otherwise) [Formula 5]

(3) Approaching
If, as indicated by Formula 6 below, the negative value of the distance-speed (i.e. the approaching speed in the distance-direction) is greater than or equal to the threshold $\eta$ (>0), the determination unit 30 determines that the object is approaching the vehicle.

$-\dot{r} \geq \eta(>0)$ [Formula 6]

The determination unit 30 can also determine whether the object is in the state of moving around toward the vehicle or the crossing state, based only on the tilt angle and the angular speed. Specifically, if the angular speed falls under the case indicated by Formula 7 below, the determination unit 30 determines that the object is in either the state of moving around toward the vehicle or the crossing state.

$\dot{\theta}<-\varepsilon$ (if $\theta>0$), $\dot{\theta}>\varepsilon$ (otherwise) [Formula 7]

Thus, the determination unit 30 can determine whether the object is in the state of moving around toward the vehicle or in the crossing state, based only on movement in the circumferential direction. In this case, movements in the circumferential direction in the real space correspond to movements in the horizontal direction in the normalized image in one-to-one correspondence, and accordingly, normal coordinate transformation operation with two variables can be replaced with coordinate transformation operation with one variable. Accordingly, in this case, the number of pieces of data in a reference table and the number of times of data access are halved from these numbers in the case of using two variables, and thus, the load on the determination unit 30 is reduced.

Here, processing to generate a normalized image based on a fish-eye image performed by the normalized image acquisition unit 10 will be described in more detail with reference to FIGS. 4 to 10.

First, terms used in this example embodiment will be described. In this example embodiment, when a fish-eye image is normalized (distortion is removed therefrom), a viewpoint is set in a horizontal plane, and a plane (target plane) that serves as a reference of this horizontal plane is determined. As a target plane, a plane (ground plane) is selected with which a vertically-elongated target object, which is a target that is to be normalized, is in contact. If, for example, the target of normalization is a pedestrian, examples of the target plane may include a road surface, a floor surface, and the like. The target plane may be defined as a vertical wall surface or an inclined road surface, and need not necessarily coincide with a real horizontal plane.

A description will be given below of the case where the target plane is a road surface and the target of normalization (a subject in a fish-eye image) is a pedestrian, but the application scope of the invention is not limited by these constraints.

The fish-eye image acquisition unit 11 acquires fish-eye image data that is output from the image output device 200 to the normalized image acquisition unit 10. Upon acquiring the image data, the fish-eye image acquisition unit 11 can also perform processing to adjust the image format on the image data, e.g. processing to crop a necessary image region, processing to adjust the resolution and size, processing to extract an odd-numbered (or even-numbered) fields from an NTSC image, and processing to improve image quality.

The viewpoint compensation vector acquisition unit 12 acquires a viewpoint compensation vector from the viewpoint compensation vector generating unit 14. The viewpoint compensation vector generating unit 14 generates, as a viewpoint compensation vector, the relative vector between the optical axis vector of the imaging device and a vector parallel to the target plane. This relative vector is a vector that expresses a rotation between two coordinate systems.

Normally, examples of the method of expressing a rotation may include a quaternion, the Euler-angle expression, and the like, and any kind of expression method may be employed in this example embodiment. As an example, the Euler-angle expression will be used in the following description. Note that the Euler-angle expression is arbitrary in terms of the order of rotation, and the ZXY Euler-angle expression is used here.

Coordinate system and rotation axes of the imaging device will be described with reference to FIG. 4. FIG. 4 shows a definition of a coordinate system of the imaging device that is used in the example embodiment of the invention. First, in this example embodiment, the relative vector at least includes a two-dimensional value constituted by the roll angle and the pitch angle. The roll angle and the pitch angle are rotation angles that are necessary for matching the horizontal plane (x-z plane) that includes the optical axis of the camera with the target plane.

In this example embodiment, a given angle included in the range of the horizontal angle of view of a fish-eye image is designated as the yaw angle. The yaw angle determines the central viewpoint (in the horizontal direction) of an ultimately-generated image. Accordingly, to make the best use of the horizontal angle of view of an original fish-eye image, the yaw angle of the optical axis of the real imaging device (camera) is preferably used as-is as the yaw angle.

Figure 5:
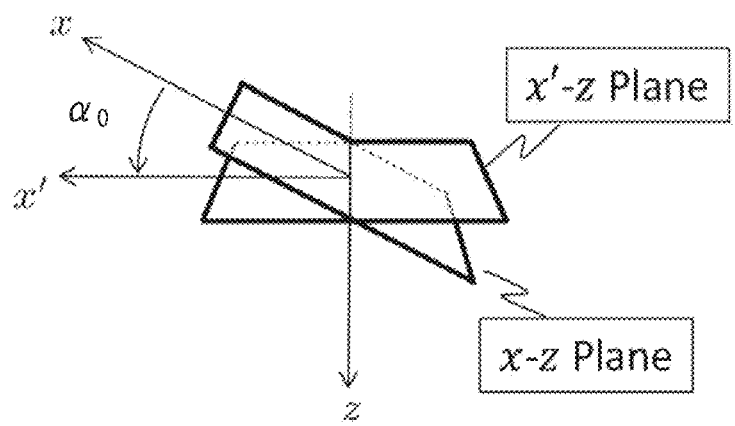
FIG. 5 illustrates a viewpoint compensation vector that is expressed using the ZXY Euler-angle expression.
Figure 5:
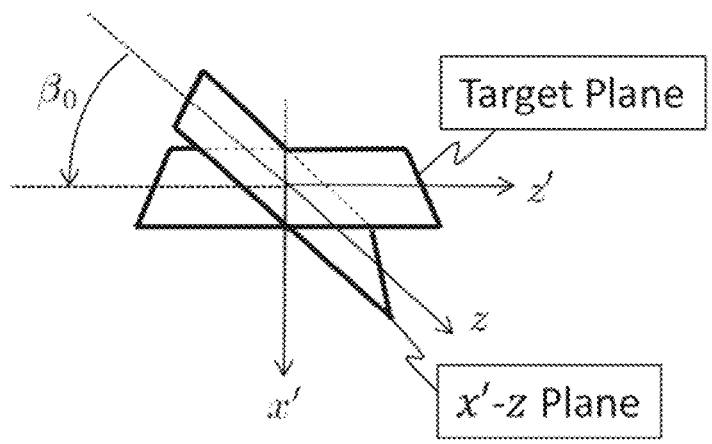

The form of expression of a viewpoint compensation vector will be described with reference to FIG. 5. FIG. 5 illustrates a viewpoint compensation vector that is expressed using the ZXY Euler-angle expression. In the ZXY Euler-angle expression, the roll angle and the pitch angle are defined as follows, with reference to FIG. 5. Note that the roll angle and the pitch angle that constitute a viewpoint compensation vector will be particularly referred to as a "relative roll angle" and a "relative pitch angle", respectively.

That is to say, at the coordinate system of the imaging device, the angle of rotation around the z-axis from the x-z plane to the x'-z plane with a roll angle matched with that of the target plane is defined as a relative roll angle $\alpha_0$, as shown in FIG. 5. Also, the angle of rotation around the x'-axis from the x'-z plane to the x'-z' plane parallel to the target plane is defined as a relative pitch angle $\beta_0$.

If a given yaw angle $\gamma_0$ is provided, the viewpoint compensation vector V is expressed by Formula 8 below, for example. Note that, if the given yaw angle $\gamma_0$ is provided by the camera optical axis, $\gamma_0=0$ holds in Formula 8 below.

$$V=(\alpha_0,\beta_0,\gamma_0)^T \quad \text{[Formula 8]}$$

Figure 6:
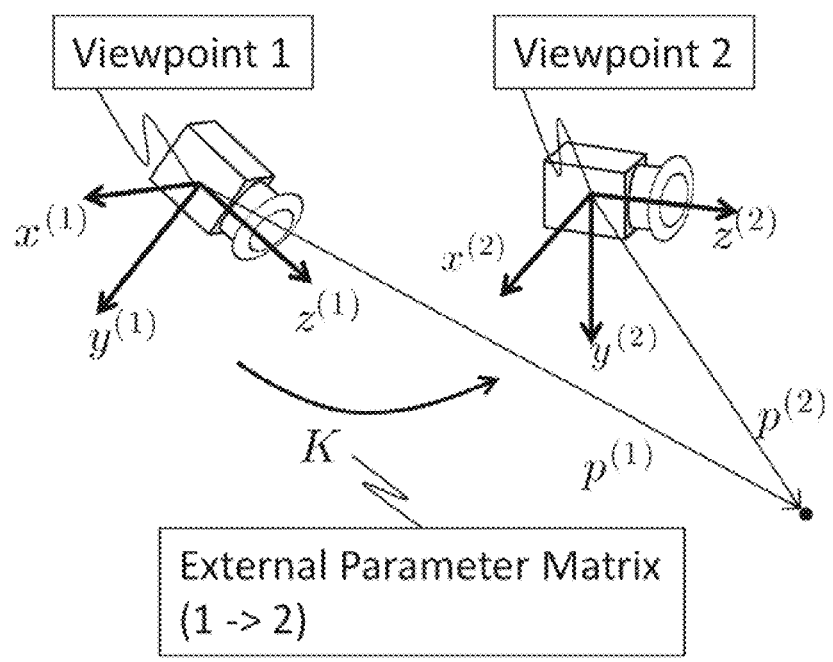
FIG. 6 illustrates coordinate transformation between two viewpoints that is performed in the example embodiment of the invention.

Use of the viewpoint compensation vector V enables coordinate transformation between two viewpoints. FIG. 6 illustrates coordinate transformation between two viewpoints that is performed in the example embodiment of the invention. Referring to FIG. 6, normally, coordinate transformation with respect to a certain point in a physical space can be described as Formula 9 below, using an external parameter matrix K for a coordinate system 1 to a coordinate system 2.

$$\tilde{p}^{(2)}=K\cdot\tilde{p}^{(1)} \quad \text{[Formula 9]}$$

Here, p-tilde(i) is a homogeneous expression of the position coordinates in a coordinate system i. The homogeneous expression is expressed by Formula 10 below.

$$\tilde{p}^{(i)}=(x^{(i)},y^{(i)},z^{(i)},1)^T \quad \text{[Formula 10]}$$

K in Formula 2 above is normally described by Formula 11 below, using a rotation matrix R and a translation vector t.

$$K = \begin{pmatrix} R & t \\ 0 \ 0 \ 0 & 1 \end{pmatrix} \quad \text{[Formula 11]}$$

In the ZXY Euler-angle expression, the rotation matrix R is described by Formula 12 below, using the roll angle $\alpha$, the pitch angle $\beta$, and the yaw angle $\gamma$ in the definition.

[Formula 12]

$$\begin{aligned} R &:= R_{zxy}(\alpha, \beta, \gamma) \\ &= R_y(\gamma)R_x(\beta)R_z(\alpha) \\ &= \begin{bmatrix} \cos(\gamma) & 0 & \sin(\gamma) \\ 0 & 1 & 0 \\ -\sin(\gamma) & 0 & \cos(\gamma) \end{bmatrix} \begin{bmatrix} 1 & 0 & 0 \\ 0 & \cos(\beta) & -\sin(\beta) \\ 0 & \sin(\beta) & \cos(\beta) \end{bmatrix} \begin{bmatrix} \cos(\alpha) & -\sin(\alpha) & 0 \\ \sin(\alpha) & \cos(\alpha) & 0 \\ 0 & 0 & 1 \end{bmatrix} \\ &= \begin{bmatrix} \cos\alpha\cos\gamma - \sin\alpha\sin\beta\sin\gamma & -\cos\beta\sin\alpha & \cos\alpha\sin\gamma + \cos\gamma\sin\alpha\sin\beta \\ \cos\gamma\sin\alpha + \cos\alpha\sin\beta\sin\gamma & \cos\alpha\cos\beta & \sin\alpha\sin\gamma - \cos\alpha\cos\gamma\sin\beta \\ -\cos\beta\sin\gamma & \sin\beta & \cos\beta\cos\gamma \end{bmatrix} \end{aligned}$$

Here, the viewpoint transformed by the viewpoint compensation vector V provided by Formula 8 above will be referred to as a "central horizontalized viewpoint", and the coordinate system in which the viewpoint exists will be referred to as a "central horizontalized viewpoint coordinate system".

Figure 7:
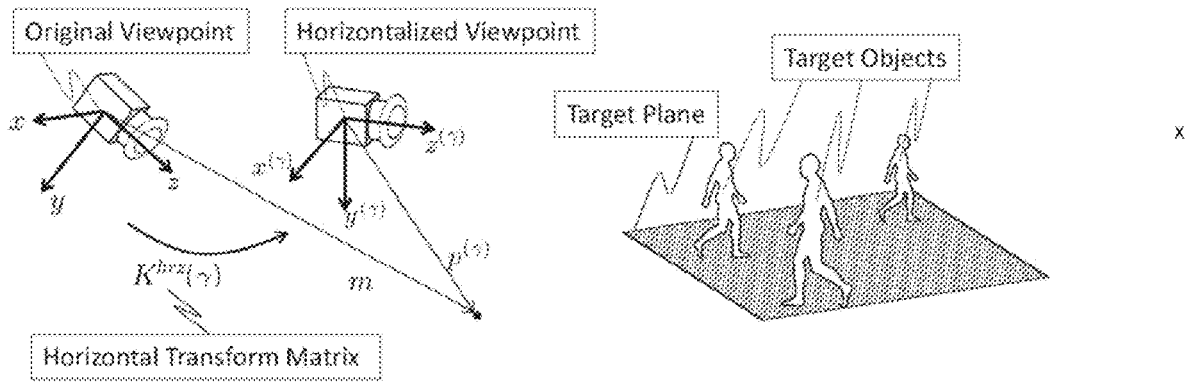
FIG. 7 illustrates a coordinate system that is based on an original viewpoint and a horizontalized viewpoint coordinate system that are used in the example embodiment of the invention.

Also, a set of viewpoints that are parallel to the target plane and are obtained by rotating the central horizontalized viewpoint by a given yaw angle γ will be referred to as "horizontalized viewpoints", and the coordinate system from each of these viewpoints will be referred to as a "horizontalized viewpoint coordinate system". FIG. 7 illustrates a coordinate system based on an original viewpoint and a horizontalized viewpoint coordinate system that are used in the example embodiment of the invention.

The horizontalized viewpoint coordinate system is obtained by coordinate transformation using a given γ and a viewpoint compensation vector ($\alpha_0$, $\beta_0$). The coordinate transformation to horizontalized viewpoint coordinates can be described by Formula 13 below, using an external parameter matrix $K^{hrz}(\gamma)$ in which $(\alpha,\beta)=(\alpha_0, \beta_0)$ in Formulas 11 and 12 above.

$$\tilde{p}^{(\gamma)} = K(\alpha_0,\beta_0,\gamma) \cdot \tilde{m} = K^{hrz}(\gamma) \cdot \tilde{m} \quad \text{[Formula 13]}$$

Here, the coordinates in the coordinate system based on an original viewpoint and the coordinates in a horizontalized viewpoint coordinate system are expressed as Formulas 14 and 15 below, respectively.

$$\tilde{m} = (x,y,z,1)^T \quad \text{[Formula 14]}$$

$$\tilde{p}^{(\gamma)} = (x^{(\gamma)}, y^{(\gamma)}, z^{(\gamma)}, 1)^T \quad \text{[Formula 15]}$$

If the central horizontalized viewpoint shares its origin with the original viewpoint, the translation vector t in $K^{hrz}(\gamma)$ can be expressed as $t=(0, 0, 0)^T$.

As described above, if the viewpoint compensation vector V is given, coordinate transformation $K^{hrz}(\gamma)$ from the coordinate system based on the original viewpoint to the horizontalized viewpoint coordinate system can be defined. In this example embodiment, the viewpoint compensation vector generating unit 14 generates a horizontal transform matrix $K^{hrz}(\gamma)$, and gives it to the viewpoint compensation vector acquisition unit 11.

In this example embodiment, the image generating unit 13 sets viewpoints in accordance with the number of all pixels of the generated normalized image in the horizontal direction. Also, the image generating unit 13 performs distortion correction and then crops a corrected fish-eye image in the vertical direction for each of the viewpoints, and extracts slice images on which the lines of sight from the respective viewpoints are incident. The image generating unit 13 then arranges the extracted slice images in the horizontal direction in a predetermined order to generate one normalized image.

Specifically, the image generating unit 13 initially makes a set of horizontalized viewpoints using the viewpoint compensation vector V, for a fish-eye image acquired by the fish-eye image acquisition unit 11. Next, the image generating unit 13 divides the field-of-view range in the horizontal direction in any manner, and performs distortion correction using perspective projection approximation in the horizontalized viewpoint coordinate system of each set of the horizontalized viewpoints (horizontalized viewpoint series). The image generating unit 13 then arrange image elements in the vertical direction that pass through the center of the respective viewpoints, in the horizontal direction in the order of the horizontalized viewpoint series, and connecting these image elements, thereby generating one composite image. Processing performed by the image generating unit 13 will be described below in detail.

Distortion Correction Using Perspective Projection Approximation:

Distortion correction using perspective projection approximation will now be described in detail. Normally, distortion correction using perspective projection approximation (perspective projection correction) can be obtained using the following method, if a camera model and calibrated internal parameters in the camera model are known. Note that distortion correction using perspective projection approximation, which can be realized using existing techniques, will be briefly described below for reference.

A relational expression between a point $p=(x, y, z)^T$ in the real space in a normal camera coordinate system and a point in a fish-eye image can be modeled by Formulas 16 to 18 below. Here, ρ' in Formula 16 is expressed by Formula 19.

$$p = \begin{bmatrix} x \\ y \\ z \end{bmatrix} \alpha \begin{bmatrix} u' \\ v' \\ f(\rho') \end{bmatrix} \quad \text{[Formula 16]}$$

$$f(\rho') = a_0 + a_1 \cdot \rho' + a_2 \cdot \rho'^2 + \ldots + a_N \cdot \rho'^N \quad \text{[Formula 17]}$$

$$\begin{bmatrix} u'' \\ v'' \end{bmatrix} = \begin{bmatrix} c & d \\ e & 1 \end{bmatrix} \begin{bmatrix} u' \\ v' \end{bmatrix} + \begin{bmatrix} u_0'' \\ v_0'' \end{bmatrix} \quad \text{[Formula 18]}$$

$$\rho' = \sqrt{u'^2 + v'^2} \quad \text{[Formula 19]}$$

(u', v') in Formulas 16 and 18 above denotes coordinates (with the center being the origin) of an ideal fish-eye image without an affine distortion. (u", v") in Formula 18 denotes coordinates in a real fish-eye image (with the upper left point being the origin), and ($u_0''$, $v_0''$) denotes the center coordinates of the real fish-eye image. Furthermore, the 2×2 positive direction matrix in Formula 18 is an affine transform matrix.

The parameters obtained by approximating coefficients in Formula 17 above to the fourth order are internal parameters of the camera that are determined by distortion characteristics of the fish-eye lens, a shift in the positional relationship between the optical axis of the fish-eye lens and the image sensor, and the like. Note that these parameters are expressed by Formula 20 below.

$$[a_0, a_1, a_2, a_3, a_4, c, d, e, u_0'', v_0''] \quad \text{[Formula 20]}$$

The parameters denoted by Formula 20 above can be obtained in advance by a calibration method that is disclosed in the following reference.

REFERENCE

Davide Scaramuzza, Agostino Martinelli and Roland Siegwart, "A Toolbox for Easily Calibrating Omnidirectional Cameras", IROS, 2006.

Here, if an image plane ($z=z_d$) perpendicular to the z-axis of the coordinate system is set, the coordinate (u", v") in a fish-eye image that correspond to the coordinates ($u_d$, $v_d$) in an image defined in the image plane ($z=z_d$) can be obtained using the relational expressions of Formulas 16 to 18 above. Accordingly, an image that has been subjected to distortion correction using perspective projection approximation (which will be referred to as a "perspective projection corrected image") can be generated by referencing a pixel value at the coordinates (u″, v″) in the fish-eye image that correspond to the coordinates ($u_d$, $v_d$) in the image and replacing the pixel value at the image coordinates ($u_d$, $v_d$) with the pixel value at the coordinates (u″, v″) in the fish-eye image.

Note that a pixel value at coordinates in the fish-eye image is a brightness value with a single channel in the case of a monochrome image, and is a brightness value with three RGB channels in the case of a color image. The value of $z=z_d$ expresses the distance of the projection plane from a focal point, and this is a parameter that determines the scale of the perspective projection corrected image.

Effects of Distortion Correction Using Perspective Projection Approximation

Since a horizontal transform matrix is given by a viewpoint compensation vector, a perspective projection image plane at any horizontalized viewpoint can be defined. As a result, the image generating unit 13 can generate, for each horizontalized viewpoint, a perspective projection corrected image at each viewpoint using the above-described method.

It is known that, in the perspective projection corrected image, the linearity is restored whereas a scale distortion of a subject imaged further expands toward peripheral portions due to a projection distortion. Accordingly, the image generating unit 13 extracts, for each viewpoint, only center columns of the generated perspective projection corrected images, and connects these center columns in the horizontal direction. Thus, a scale distortion in the horizontal direction is suppressed, and a single, continuous image is generated in which the linearity in the vertical direction is maintained. As a result, a single normalized image is composed that has little shape distortion and in which all three-dimensional elongated objects that are present in the target plane imaged in the original fish-eye image have a consistent scale.

Specific Processing Performed by Image Generating Unit

A specific example of processing performed by the image generating unit 13 will now be described below. An image column that passes through the center of a perspective projection corrected image ($I_P$) generated in each horizontalized viewpoint coordinate system based on the original fish-eye image ($I_F$) will be referred to as a "normalized slice image ($I_S$)". An ultimate output image will be referred to as a "normalized panoramic image ($I_H$)". In this example embodiment, a series of functions performed until the normalized panoramic image is generated is the functionality of the image generating unit 13.

Initially, in the image generating unit 13, the size (width, height) of the ultimately-output image=($W_O$, $H_O$) is defined. Next, the image generating unit 13 defines a horizontalized viewpoint series that is to be used to compose the normalized panoramic image. Since the roll angle and the pitch angle of the viewpoints have been determined by the viewpoint compensation vector V, a yaw angle set Φ need only be defined here. Φ is a series including the same number of yaw angles as the number of horizontal pixels of an image, and is expressed by Formula 21 below.

$$\Phi = \{\phi_i | \phi_i > \phi_{i+1}, i=0, \ldots, W_O-1\} \quad [\text{Formula 21}]$$

Φ can be set in any manner in the horizontal field-of-view range of the original fish-eye image. The upper limit and the lower limit of Φ determine the horizontal field-of-view range (FOV_H) that is to be depicted in the normalized panoramic image. For example, if the horizontal field-of-view range: FOV_H=185° is ensured, the range of the horizontalized viewpoint series is the range indicated by Formula 22 below.

$$[\phi_{min}, \phi_{max}] = [-92.5°, 92.5°] \quad [\text{Formula 22}]$$

Normally, a fish-eye image is modeled as a mapping of a point group projected in one direction onto a spherical surface model in a real space. At this time, it can be presumed that the spherical center coincides with the optical center. Since the origin of each horizontalized viewpoint coordinate system is matched with the optical center, Φ can be defined with equal-resolution as indicated by Formula 23 below. Here, in Formula 23 below, i=0, . . . , $W_O-1$.

$$\Phi = \left\{ \phi_i = \phi_{max} - \frac{\phi_{max} - \phi_{min}}{W_O - 1} \cdot i \right\} \quad [\text{Formula 23}]$$

Since a point m-tilde in the original camera coordinate system is expressed as "$(x, y, z, 1)^T$" using the horizontal transform matrix $K^{hrz}(\gamma)$, a point in each horizontalized viewpoint coordinate system (Formula 24) can be obtained by Formula 25 below.

$$O^{(\phi_i)} \quad [\text{Formula 24}]$$

$$\tilde{p}^{(\phi_i)} = K^{hrz}(\phi_i) \cdot \tilde{m} \quad [\text{Formula 25}]$$

As mentioned above, if an image plane (Formula 27) perpendicular to the z-axis (Formula 26) of the horizontalized viewpoint coordinate system (Formula 24) is set, the correspondence with a pixel (u″, v″) in the original fish-eye image is obtained at image coordinates (Formula 28) defined in this image plane (Formula 27). An image in which points of pixels in the fish-eye image are projected onto the image coordinates (Formula 28) is the perspective projection corrected image. The constant in Formula 27 expresses the distance of a projection plane from the focal point, and is a parameter that determines the scale of the perspective projection corrected image.

$$z^{(\phi_i)} \quad [\text{Formula 26}]$$

$$z^{(\phi_i)} = z_d^{(\phi_i)} = \text{const.} \quad [\text{Formula 27}]$$

$$(u_d^{(\phi_i)}, v_d^{(\phi_i)}) \quad [\text{Formula 28}]$$

An image column in the vertical direction that passes through the center of the perspective projection corrected image ($I_P$) is the normalized slice image ($I_S$). The normalized slice image ($I_S$) is a special variation of the perspective projection corrected image ($I_P$), and is generated under a condition that the horizontal size of the projection image is set to one pixel when the perspective projection corrected image ($I_P$) is projected onto the perspective projection image plane. Note that, to generate the normalized slice image ($I_S$), it is not necessary to generate another perspective projection corrected image ($I_P$) with a larger horizontal size and crop it.

In each horizontalized viewpoint coordinate system (Formula 24), the scale parameter (Formula 30) for generating the normalized slice image (Formula 29) usually needs to be defined by the same value in each horizontalized viewpoint coordinate system, and needs to be set while giving consideration to the aspect ratio of the ultimate normalized panoramic image. The scale parameter can not only be directly defined with a value, but also be indirectly defined with other parameters, as will be described later.

$$I_S^{(\phi_i)} \qquad \text{[Formula 29]}$$

$$Z_d = \{z_d^{(\phi_i)}\} \qquad \text{[Formula 30]}$$

In this example embodiment, a composite image obtained by arranging the normalized slice images (Formula 29) in the horizontalized viewpoint coordinate systems (Formula 24) from the left in the order of the series of yaw angles $\Phi$ of the horizontalized viewpoints is used as the normalized panoramic image ($I_H$). Elements of the normalized panoramic image ($I_H$) are defined by Formula 31 below. Here, in Formula 31, symbols in brackets denote image coordinates. Also, it is assumed that i=0, 1, . . . $W_0$−1, and j=0, 1, . . . $H_0$−1.

$$\{I_H(i,j)\} = \{I_S^{(\phi_i)}(0,j)\} \qquad \text{8 Formula 31]}$$

Figure 8:
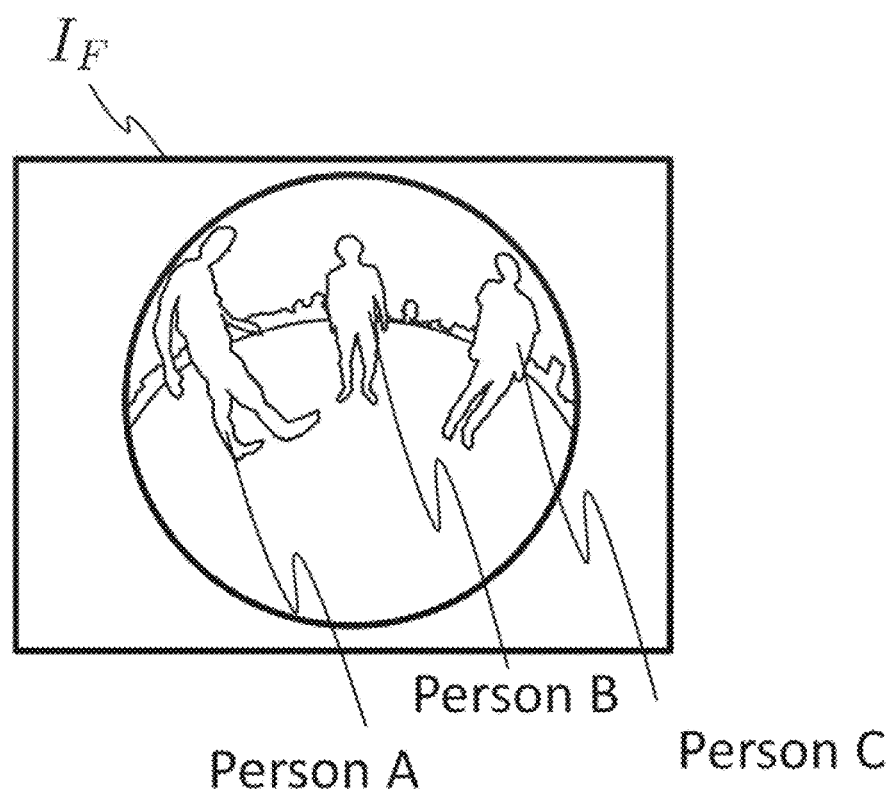
FIG. 8 schematically shows an example of a fish-eye image ($I_F$) to which the example embodiment of the invention is applied.
Figure 9:
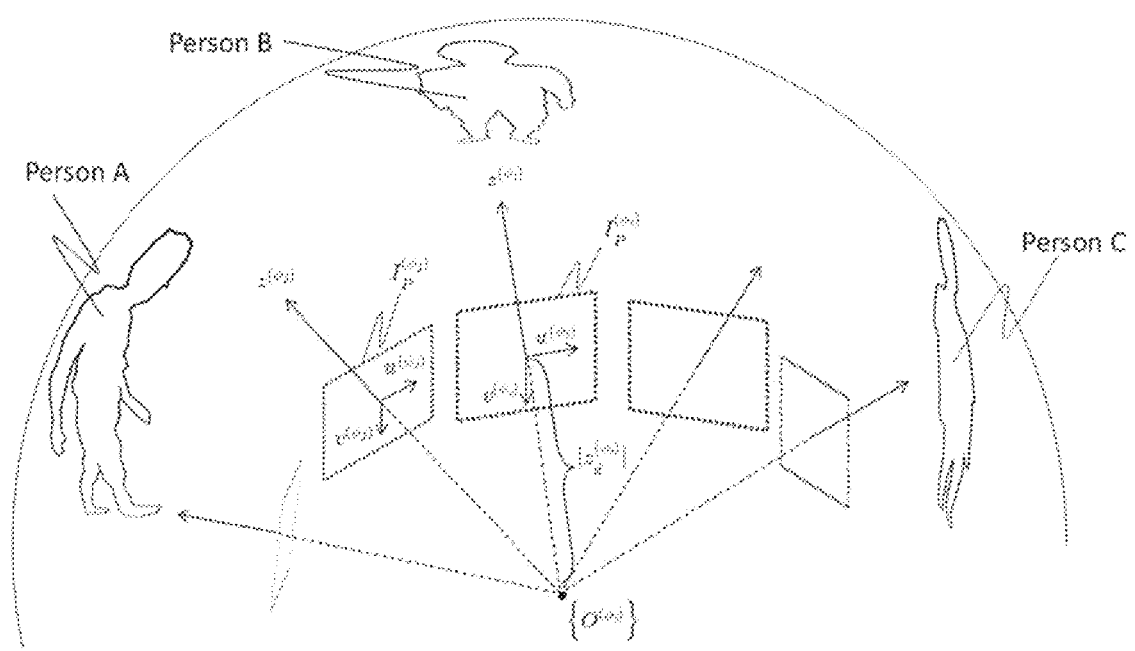
FIG. 9 shows examples of horizontalized viewpoint coordinate systems that are defined in the example embodiment of the invention.

Here, a description will be given, with reference to FIGS. 8 to 10, of an example of a fish-eye image and image generation processing. FIG. 8 schematically shows an example of a target fish-eye image ($I_F$) in the example embodiment of the invention. In the example in FIG. 8, people (person A, person B, and person C), whose image has been shot from a downward viewpoint, appear in the fish-eye image, with the ground surface serving as a target plane.

The fish-eye image shown in FIG. 8 is processed by the normalized image acquisition unit 10. Thus, a perspective projection image plane is defined in each of the horizontalized viewpoint coordinate systems (Formula 24), as shown in FIG. 9. FIG. 9 shows an example of the horizontalized viewpoint coordinate systems defined in the example embodiment of the invention. Coordinates in the perspective projection image plane is expressed by Formula 28 above, A perspective projection corrected image ($I_P$: Formula 32) with a given image size that includes a normalized slice image ($I_S$) is generated in the perspective projection image plane.

$$I_P^{(\theta\phi_i)} \qquad \text{[Formula 32]}$$

Figure 10:
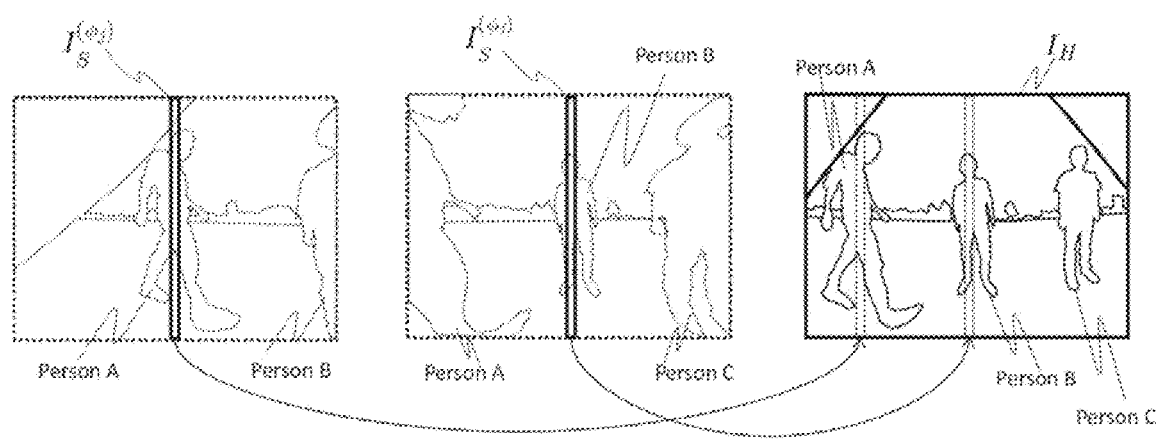
FIG. 10 shows two perspective projection corrected images with different horizontalized viewpoints, and a normalized panoramic image obtained based on these perspective projection corrected images.

FIG. 10 shows two perspective projection corrected images with different horizontalized viewpoints, and a normalized panoramic image obtained based on these perspective projection corrected images.

Specifically, a perspective projection corrected image (Formula 34) and a normalized slice image (Formula 35) that are generated with a horizontalized viewpoint (Formula 33) are shown on the left side of FIG. 10. Also, a perspective projection corrected image (Formula 37) and a normalized slice image (Formula 38) that are generated with a horizontalized viewpoint (Formula 36) are shown, as an example, in the center of FIG. 10.

$$O^{(\phi_i)} \qquad \text{[Formula 33]}$$

$$I_P^{(\phi_i)} \qquad \text{[Formula 34]}$$

$$I_S^{(\phi_i)} \qquad \text{[Formula 35]}$$

$$O^{(\phi_j)} \qquad \text{[Formula 36]}$$

$$I_P^{(\phi_j)} \qquad \text{[Formula 37]}$$

$$I_S^{(\phi_j)} \qquad \text{[Formula 38]}$$

An example of a normalized panoramic image ($I_H$) that is generated using all of the normalized slice images generated with the defined horizontalized viewpoint series (Formula 39) is shown on the right side of FIG. 10. As shown in FIG. 10, the normalized panoramic image ($I_H$) is composed using, as elements, all of the normalized slice images including the normalized slice images (Formula 35) and (Formula 38 above).

$$\Phi = \{\phi_i\} \qquad \text{[Formula 39]}$$

Processing to Indirectly Determine Scale Parameter:

Also, in distortion correction using perspective projection approximation at each viewpoint, the image generating unit 13 also determines the distance to the origin in the projection plane of horizontalized viewpoint coordinate system, based on the size, the range of the angle of view in the horizontal direction, and the aspect ratio of a normalized panoramic image to be generated.

That is to say, the image scale when the perspective projection corrected images and the normalized slice images are generated is determined by the distance $|z_d|$ to the projection plane at respective coordinates, as mentioned above. However, in practice, there are cases where it is more convenient to indirectly determine the image scale so as to satisfy constrains such as the field-of-view range and the image size of the normalized panoramic image, than to directly designate the image scale.

A description will be given here of a method of designating the image size, the range of the angle of view in the horizontal direction, and the aspect ratio of the image to obtain the scale. Here, it is assumed that the size (width, height) of the normalized panoramic image is denoted as ($W_0$, $H_0$), the size of the angle of view in the horizontal direction that is to be projected onto the normalized panoramic image is denoted as $A_X$, and the size of the angle of view in the vertical direction is denoted as Ay. The angle-pixel ratio of the normalized panoramic image between the vertical and horizontal directions is expressed as Formula 40 below. Here, in Formula 40 below, the upper limit value of Ay is 180 degrees (Formula 41).

$$\mu = \frac{A_Y/H_0}{A_X/W_0} \qquad \text{[Formula 40]}$$

$$A_{Y_{max}} < 180° \qquad \text{[Formula 41]}$$

The scale $|z_d|$ is determined by the following steps (a) and (b).

Step (a):

($|z_d|$, Ay) is determined with ($W_0$, $H_0$, $A_X$, $\mu$) serving as a constraint condition, using Formulas 42 and 43 below.

$$A_Y = A_X \times \frac{H_0}{W_0} \times \mu \qquad \text{[Formula 42]}$$

$$|z_d| = \frac{H_0/2}{\tan(A_Y/2)} \qquad \text{[Formula 43]}$$

Step (b):

When Formula 44 below holds, ($A_X$, $A_Y$, $|z_d|$) is replaced with Formula 48 below through recalculation using Formulas 45 to 47 below.

$$A_Y \geq A_{Y_{max}} \qquad \text{[Formula 44]}$$

$$A_Y^* = A_{Y_{max}} \qquad \text{[Formula 45]}$$

-continued $$A_X = A_Y^* \times \frac{W_0}{H_0} \times \frac{1}{\mu}$$ [Formula 46]

$$|z_d|^* = \frac{H_0/2}{\tan(A_Y^*/2)}$$ [Formula 47]

$$(A_X^*, A_Y^*, |z_d|^*)$$ [Formula 48]

Speedup Through LUT Processing:

In this example embodiment, the viewpoint compensation vector acquisition unit 12 can acquire a table that describes, as viewpoint compensation vectors, correspondence between coordinates in an image obtained by shooting a target object from a direction parallel to the ground surface and coordinates in a fish-eye image.

Specifically, in this example embodiment, in the case of using a predetermined fixed viewpoint compensation vector, the viewpoint compensation vector generating unit 14 generates, in advance, a reference table that describes correspondence between coordinates in a normalized panoramic image ($u_H$, $v_H$) and coordinates in a corresponding original fish-eye image (u", v"). In this case, actual processing to generate a normalized panoramic image corresponding to an input image series can be replaced with Look-Up-Table (LUT) processing to generate the normalized panoramic image while referencing the reference table.

For example, by generating a reference table off-line and performing the LUT processing as processing to sequentially generate a normalized panoramic image for an input image series that is given on-line, the normalized panoramic image can be generated at high speed based on a fish-eye image. In this mode, an image processing system can be built that is favorable for use in the case where the system needs to be installed on a processor with a low processing clock frequency.

A method that is schematically described below is conceivable as a specific method for generating the reference table. First, a two-channel matrix (which will be called "index map") with the width and height of the size ($W_{in}$, $H_{in}$) of an original fish-eye image is prepared. A corresponding coordinate value at (u") is given to each column of an X-index map ($X_{ind}$), which is a matrix of the first channel, and a corresponding coordinate value at (v") is given to each column of a Y-index map ($Y_{ind}$), which is a matrix of the second channel.

That is to say, the index maps are defined by Formulas 49 and 50 below. Here, Formula 51 is a condition.

$$\{X_{ind}(i,j)=u"(i)|i=0,\ldots,W_{in}-1,j=0,\ldots,H_{in}-1\}$$ [Formula 49]

$$\{Y_{ind}(i,j)=v"(j)|i=0,\ldots,W_{in}-1,j=0,\ldots,H_{in}-1\}$$ [Formula 50]

$$\{u"(i)=i|i=0,\ldots,W_{in}-1\},\{v"(j)|j=0,\ldots,H_{in}-1\}$$ [Formula 51]

Then, upon the image generating unit 13 generating normalized panoramic images with ($X_{ind}$) and ($Y_{ind}$) as input, the viewpoint compensation vector generating unit 14 generates LUT maps ($X_{LUT}$) and ($Y_{LUT}$) based on the respective normalized panoramic images. In the LUT maps, values at corresponding original fish-eye image coordinates (u") and (v") are stored in the coordinates ($u_H$, $v_H$) in ($X_{LUT}$) and ($Y_{LUT}$) respectively. Accordingly, the one-to-one correspondence between the coordinates ($u_H$, $v_H$) and the coordinates (u", v") in the fish-eye image is obtained.

The thus-created LUT maps can be saved as reference table files in a text file format in which the one-to-one correspondence relationship (Formula 52) is listed row-by-row, for example.

$$[u_H, v_H, u", v"]$$ [Formula 52]

In the LUT processing, the image generating unit 13 first loads a reference table file that is generated in advance. The image generating unit 13 then successively references pixel values in the fish-eye image that correspond to the normalized panoramic image coordinates and generates the normalized panoramic image, in accordance with information that associates the coordinates ($u_H$, $v_H$) in the normalized panoramic image and the coordinates (u", v") in the acquired original fish-eye image that are described in the reference tables.

Apparatus Operations

Figure 11:
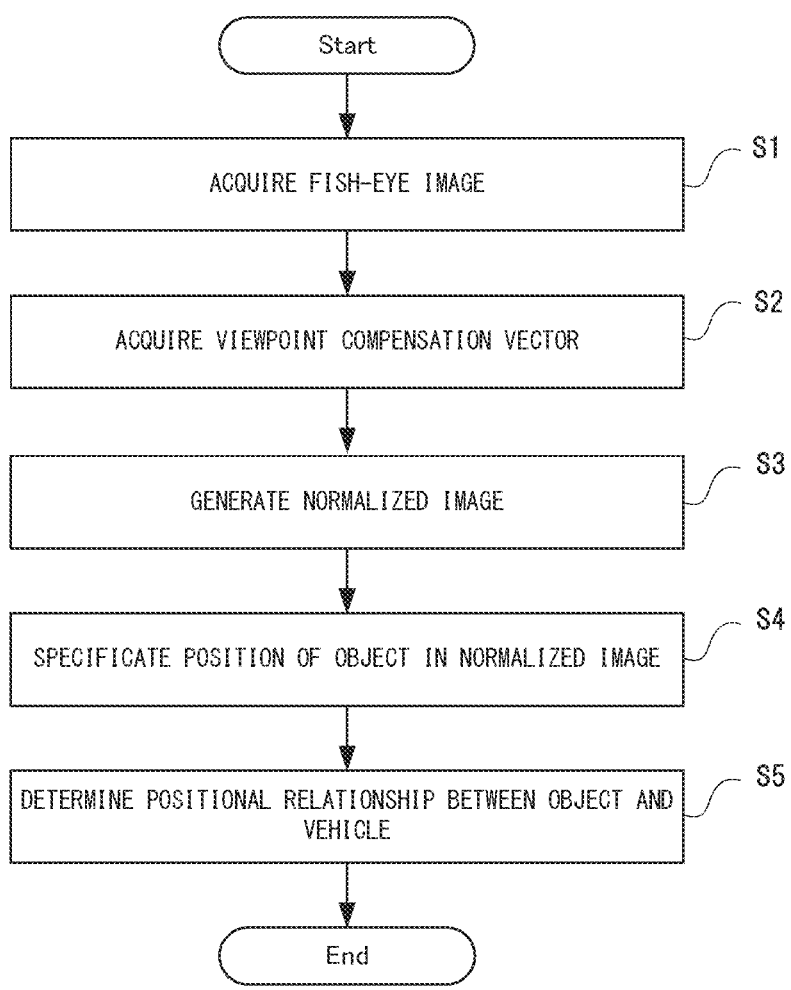
FIG. 11 is a flowchart that shows operations of the object detection apparatus according to the example embodiment of the invention.

Next, operations of the object detection apparatus 100 in this example embodiment will be described with reference to FIG. 11. FIG. 11 is a flowchart that shows operations of an object detection apparatus according to the example embodiment of the invention. The following description will refer to FIGS. 1 to 10 as appropriate. In this example embodiment, an object detection method is carried out by operating the object detection apparatus 100. Accordingly, the following description of the operations of the object detection apparatus 100 replaces the description of the object detection method according to this example embodiment.

As shown in FIG. 11, initially, in the normalized image acquisition unit 10, the fish-eye image acquisition unit 11 acquires a fish-eye image from the image output device 200 (step S1). Next, the viewpoint compensation vector acquisition unit 12 acquires a viewpoint compensation vector (step S2).

Next, the image generating unit 13 generates a normalized image using the fish-eye image acquired in step S1 and the viewpoint compensation vector acquired in step S2 (step S3).

Next, the position detecting unit 20 detects the position coordinates of an object in the normalized image generated in step S3 (step S4).

Thereafter, the determination unit 30 determines the positional relationship between the object and the vehicle (object detection apparatus 100) using the position coordinates of the object in the normalized image that is detected in step S4 (step S5). After step S5 has been performed, the object detection apparatus 100 outputs the determination result to a control device or the like of the vehicle.

Figure 12:
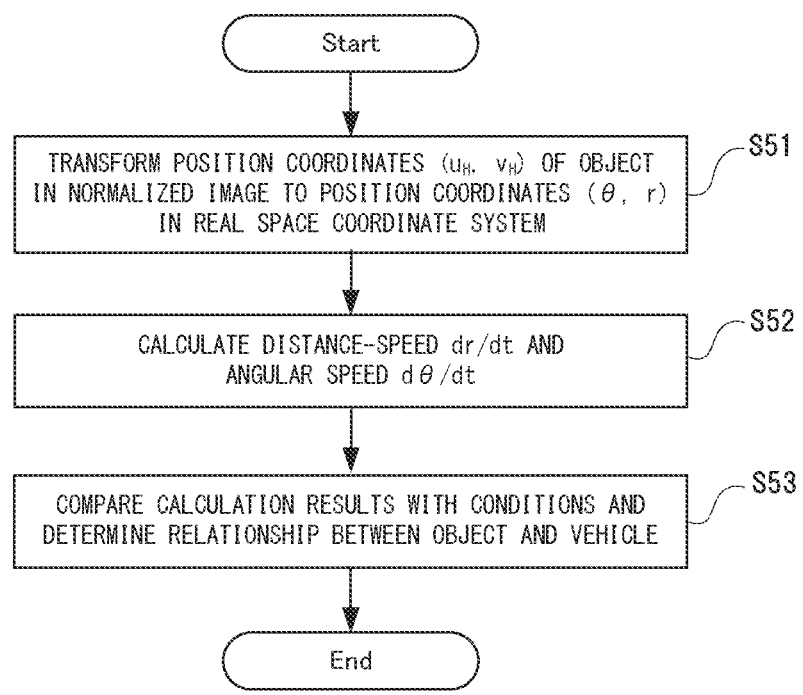
FIG. 12 is a flowchart that shows determination processing shown in FIG. 11 in more detail.

Processing in the aforementioned step S5 will now be described in detail with reference to FIG. 12. FIG. 12 is a flowchart that shows the determination processing shown in FIG. 11 in more detail.

As shown in FIG. 12, initially, the determination unit 30 transforms the position coordinates ($u_H$, $v_H$) of the object in the normalized image that is detected in step S4 to the position coordinates (θ, r) in a real space coordinate system, using a look-up table (step S51).

Next, the determination unit 30 adds the latest position coordinates (θ, r) obtained in step S51 to the position coordinates (θ, r) that has been obtained in the past transform processing, and calculates the distance-speed dr/dt and the angular speed dθ/dt (step S52).

Next, the determination unit 30 compares the calculation result in step A52 with the conditions that are provided by Formulas 4 to 6 above, and determines whether or not the calculation result in step S52 falls under any of the conditions, thereby determining the relationship between the object and the vehicle (step S53).

As mentioned above, if the calculation result in step S52 falls under Formula 4, the determination unit 30 determines that the object is moving around toward the vehicle, and if the calculation result in step S52 falls under Formula 5, the determination unit 30 determines that the object is crossing in front of the vehicle. If the calculation result in step S52 falls under Formula 6, the determination unit 30 determines that the object is approaching the vehicle.

Thus, by performing steps S1 to S5 (S51 to S53), a normalized image is generated based on a fish-eye image, and the state of an object is determined based on the generated normalized image. Steps S1 to S5 are repeatedly performed until the operation of the vehicle stops, and the state of the object is always determined while the vehicle is operating.

Effects of Example Embodiment

As described above, in this example embodiment, the positional relationship between a fish-eye camera and a ground plane is compensated, then a shape distortion of a pedestrian image in a fish-eye image is corrected, and the pedestrian image is normalized so as to appear similarly to that in a normal camera image. The normalized image is obtained by connecting normalized slice images of perspective projection corrected images that are obtained for respective horizontalized viewpoints in the entire horizontal field-of-view range. For this reason, according to this example embodiment, the distortion correction accuracy is not affected by the optical system of the imaging device. In addition, even if the positional relationship between the optical axis of the fish-eye camera and the ground plane of a target object does not satisfy a certain condition, distortion in the fish-eye image is removed accurately.

In this normalized image, objects at an equal distance from the optical center of the camera at the entire horizontal angle of view of the fish-eye image are projected as normalized objects at an equal magnification ratio on a single image. Accordingly, in this example embodiment, an image that reflects the actual distance can also be presented to a user.

The horizontal direction and the vertical direction of the normalized image correspond to the circumferential direction and the radial direction, respectively, at polar coordinates with a center being the optical center of the camera that is defined in a horizontal plane. Thus, this example embodiment utilizes this correspondence, and movement of an object can be detected if an object has moved from a side of the vehicle around toward the vehicle in a moving direction thereof (optical axis direction of the camera), or if an object is crossing in front of the vehicle.

Program

A program according to this example embodiment need only be a program for causing a computer to perform steps S1 to S5 shown in FIG. 11. By installing this program in the computer and executing it, the object detecting apparatus 100 and the object detection method according to this example embodiment can be realized. In this case, a CPU (Central Processing Unit) of the computer functions as the normalized image acquisition unit 10, the position detecting unit 20, and the determination unit 30, and performs processing. Examples of the computer may include not only a general-purpose computer such as a personal computer, but also a computer that is mounted in an automobile, an electrical appliance, work equipment, or the like.

The program according to this example embodiment may also be executed by a computer system that is constituted by a plurality of computers. In this case, for example, each of the computers may function as any of the normalized image acquisition unit 10, the position detecting unit 20, and the determination unit 30.

Physical Configuration

Figure 13:
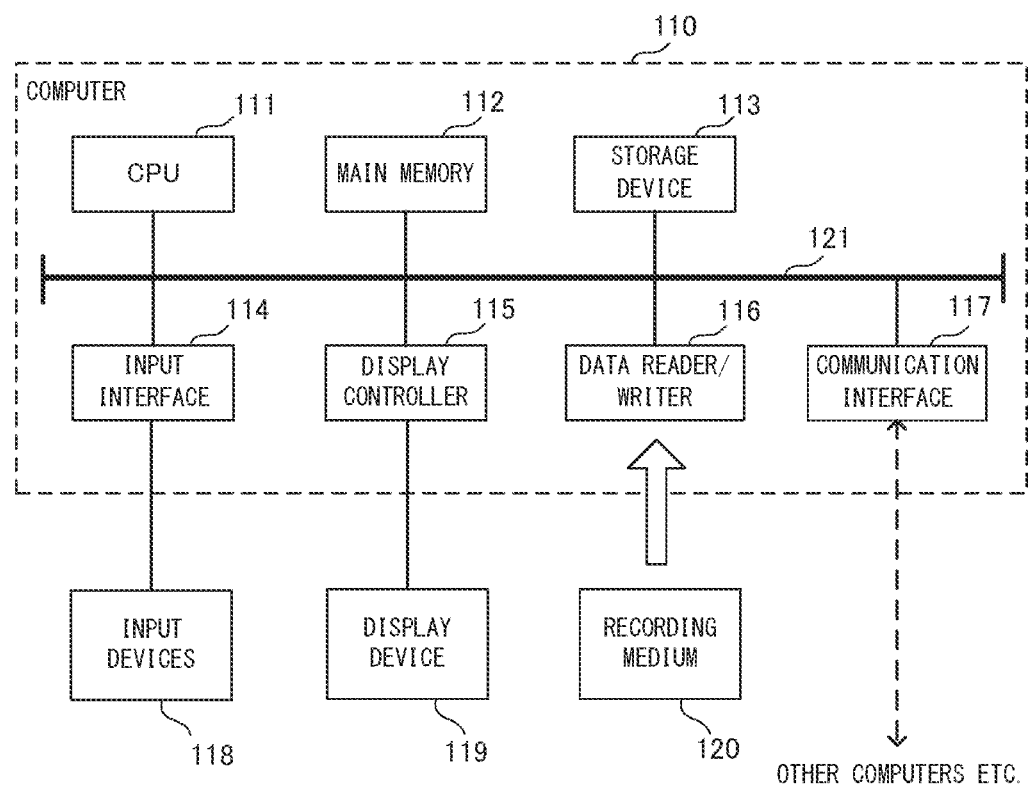
FIG. 13 is a block diagram that shows an example of a computer that realizes an object detection apparatus according to the example embodiment of the invention.

A description will now be given, with reference to FIG. 13, of a computer that realizes the object detection apparatus 100 by executing the program according to this example embodiment. FIG. 13 is a block diagram that illustrates an example of a computer that realizes the object detection apparatus according to the example embodiment of the invention.

As shown in FIG. 13, a computer 110 includes a CPU 111, a main memory 112, a storage device 113, an input interface 114, a display controller 115, a data reader/writer 116, and a communication interface 117. These units are connected to each other via a bus 121 so as to be able to communicate data.

The CPU 111 loads the program (codes) according to this example embodiment that are stored in the storage device 113 to the main memory 112 and executes the codes in a predetermined order, thereby performing various kinds of computation. The main memory 112 typically is a volatile storage device, such as a DRAM (Dynamic Random Access Memory). The programs according to this example embodiment are provided in a state of being stored in a computer readable recording medium 120. Note that the program according to this example embodiment may also be distributed on the Internet to which the computer is connected via a communication interface 117.

Specific examples of the storage device 113 may include a hard disk drive, a semiconductor storage device such as a flash memory, and the like. The input interface 114 mediates data transmission between the CPU 111 and input devices 118 such as a keyboard and a mouse. The display controller 115 is connected to a display device 119 and controls a display on the display device 119.

The data reader/writer 116 mediates data transmission between the CPU 111 and the recording medium 120, reads out the program from the recording medium 120, and writes, in the recording medium 120, the results of processing performed by the computer 110. The communication interface 117 mediates data transmission between the CPU 111 and other computers.

Specific examples of the recording medium 120 may include a general-purpose semiconductor storage device such as a CF (Compact Flash (registered trademark)) or a SD (Secure Digital), a magnetic recording medium such as a Flexible Disk, and an optical recording medium such as a CD-ROM (Compact Disk Read Only Memory).

Note that the object detection apparatus 100 according to this example embodiment can also be realized using hardware corresponding to each portion of a computer, rather than a computer in which the program is installed. Furthermore, a part of the object detection apparatus 100 may be realized by the program, and the remaining part may be realized by hardware.

Principal symbols used in this specification will now be listed below.

Set element indexes: i, j, . . .
Rotation angles (roll, pitch, yaw) in camera coordinate system: $\alpha, \beta, \gamma$
Rotation matrix: R
Translation vector: t
Camera external parameter matrix in common coordinate transformation: K
Horizontal transform matrix for given yaw angle $\gamma$: $K^{hrz}(\gamma)$
Point in original camera coordinate system: m-tilde=$(x, y, z, 1)^T$
Original fish-eye image: $I_P$
Coordinates in original fish-eye image: (u″, v″)

Normalized panoramic image: $I_H$
Output size (width, height) of normalized panoramic image: $(W_O, H_O)$
Series of yaw angle of horizontalized viewpoints: $\Phi=\{\phi_i\}$
Horizontalized viewpoint coordinate system for certain horizontalized viewpoint $\phi_i$: (Formula 53)
Perspective projection image plane coordinates for certain horizontalized viewpoint $\phi_i$: (Formula 54)
Perspective projection corrected image for certain horizontalized viewpoint $\phi_i$: (Formula 55)
Normalized slice image for certain horizontalized viewpoint: (Formula 56)
Scale parameter: (Formula 57)

$$O^{(\phi_i)} \quad \text{[Formula 53]}$$

$$(U_d^{(\phi_i)}, v_d^{(\phi_i)}) \quad \text{[Formula 54]}$$

$$I_P^{(\phi_i)} \quad \text{[Formula 55]}$$

$$I_S^{(\phi_i)} \quad \text{[Formula 56]}$$

$$Z_d = \{z_d^{(\phi_i)}\} \quad \text{[Formula 57]}$$

Part of, or the entire example embodiment described above can be expressed by the following Supplementary notes 1 to 15, but is not limited thereto.

(Supplementary Note 1)

An object detection apparatus for detecting an object in a fish-eye image, the apparatus including:

a normalized image acquisition unit configured to acquire a normalized image obtained by normalizing a fish-eye image in which an object appears;

a position detecting unit configured to detect position coordinates of the object in the normalized image; and a determination unit configured to determine a positional relationship between the object and the apparatus, using the position coordinates of the object in the normalized image.

(Supplementary Note 2)

The object detection apparatus according to Supplementary note 1, wherein the normalized image acquisition unit includes:

a fish-eye image acquisition unit configured to acquire the fish-eye image;

a viewpoint compensation vector acquisition unit configured to acquire a viewpoint compensation vector for transforming the fish-eye image to an image obtained by shooting the target object from a direction parallel to a ground plane of the object, based on a roll angle of an imaging device around an optical axis thereof and a pitch angle of the optical axis, with a plane parallel to the ground plane of the object serving as a reference; and an image generating unit configured to set, for the fish-eye image transformed using the viewpoint compensation vector, a plurality of viewpoints parallel to the ground plane along a horizontal direction of the fish-eye image, perform, for each of the set viewpoints, distortion correction using perspective projection approximation for the transformed fish-eye image, based on a coordinate system that includes a line of sight from the viewpoint as an axis, and generate one normalized image using image elements in a vertical direction that are extracted from each of the corrected fish-eye images.

(Supplementary Note 3)

The object detection apparatus according to Supplementary note 2, wherein the object detection apparatus is mounted in a vehicle, and the determination unit transforms the position coordinates of the object in the normalized image to coordinates in a coordinate system that provides position coordinates with a distance of the object to the vehicle and a tilt angle of the object relative to an optical axis of the imaging device, and determines a positional relationship between the object and the vehicle based on a time-series change in the transformed position coordinates of the object.

(Supplementary Note 4)

The object detection apparatus according to Supplementary note 3, wherein the determination unit obtains a rate of change in the distance of the object to the vehicle and a rate of change in the tilt angle of the object, based on the transformed position coordinates of the object, and determines whether the object is in a state of moving around toward the vehicle, a state of crossing in front of the vehicle, or a state of approaching the vehicle, based on the obtained rate of change in the distance of the object to the vehicle and the obtained rate of change in the tilt angle of the object.

(Supplementary Note 5)

The object detection apparatus according to Supplementary note 3 or 4, wherein the determination unit transforms, using a reference table that is created in advance, the position coordinates of the object in the normalized image to coordinates in a coordinate system that provides position coordinates with a distance of the object to the vehicle and the tilt angle of the object relative to the optical axis of the imaging device, and coordinates in the vertical direction and the horizontal direction in the normalized image, and the distance and the tilt angle that correspond to the coordinates are registered in association with each other in the reference table.

(Supplementary Note 6)

An object detection method for detecting an object in a fish-eye image, the method including:

(a) a step of acquiring a normalized image obtained by normalizing a fish-eye image in which an object appears;

(b) a step of detecting position coordinates of the object in the normalized image; and (c) a step of determining a positional relationship with the object, using the position coordinates of the object in the normalized image.

(Supplementary Note 7)

The object detection method according to Supplementary note 6, wherein the (a) step includes:

(a1) a step of acquiring the fish-eye image;

(a2) a step of acquiring a viewpoint compensation vector for transforming the fish-eye image to an image obtained by shooting the target object from a direction parallel to a ground plane of the object, based on a roll angle of an imaging device around an optical axis thereof and a pitch angle of the optical axis, with a plane parallel to the ground plane of the object serving as a reference; and (a3) a step of setting, for the fish-eye image transformed using the viewpoint compensation vector, a plurality of viewpoints parallel to the ground plane along a horizontal direction of the fish-eye image, performing, for each of the set viewpoints, distortion correction using perspective projection approximation for the transformed fish-eye image, based on a coordinate system that includes a line of sight from the viewpoint as an axis, and generating one normalized image using image elements in a vertical direction that are extracted from each of the corrected fish-eye images.

(Supplementary Note 8)

The object detection method according to Supplementary note 7 wherein the object detection method is performed in a vehicle, and in the (c) step, the position coordinates of the object in the normalized image are transformed to coordinates in a coordinate system that provides position coordinates with a distance of the object to the vehicle and a tilt angle of the object relative to an optical axis of the imaging device, and a positional relationship between the object and the vehicle is determined based on a time-series change in the transformed position coordinates of the object.

(Supplementary Note 9)

The object detection method according to Supplementary note 8, wherein, in the (c) step, a rate of change in the distance of the object to the vehicle and a rate of change in the tilt angle of the object are obtained based on the transformed position coordinates of the object, and it is determined whether the object is in a state of moving around toward the vehicle, a state of crossing in front of the vehicle, or a state of approaching the vehicle, based on the obtained rate of change in the distance of the object to the vehicle and the obtained rate of change in the tilt angle of the object.

(Supplementary Note 10)

The object detection method according to Supplementary note 8 or 9, wherein, in the (c) step, the position coordinates of the object in the normalized image are transformed, using a reference table that is created in advance, to coordinates in a coordinate system that provides position coordinates with a distance of the object to the vehicle and the tilt angle of the object relative to the optical axis of the imaging device, and coordinates in the vertical direction and the horizontal direction in the normalized image, and the distance and the tilt angle that correspond to the coordinates are registered in association with each other in the reference table.

(Supplementary Note 11)

A computer readable recording medium that includes a program recorded thereon, the program being for detecting an object in a fish-eye image using a computer and including instructions that cause the computer to carry out:

(a) a step of acquiring a normalized image obtained by normalizing a fish-eye image in which an object appears;

(b) a step of detecting position coordinates of the object in the normalized image; and (c) a step of determining a positional relationship with the object, using the position coordinates of the object in the normalized image.

(Supplementary Note 12)

The computer readable recording medium according to the supplementary note 11, wherein the (a) step includes:

(a1) a step of acquiring the fish-eye image;

(a2) a step of acquiring a viewpoint compensation vector for transforming the fish-eye image to an image obtained by shooting the target object from a direction parallel to a ground plane of the object, based on a roll angle of an imaging device around an optical axis thereof and a pitch angle of the optical axis, with a plane parallel to the ground plane of the object serving as a reference; and (a3) a step of setting, for the fish-eye image transformed using the viewpoint compensation vector, a plurality of viewpoints parallel to the ground plane along a horizontal direction of the fish-eye image, performing, for each of the set viewpoints, distortion correction using perspective projection approximation for the transformed fish-eye image, based on a coordinate system that includes a line of sight from the viewpoint as an axis, and generating one normalized image using image elements in a vertical direction that are extracted from each of the corrected fish-eye images.

(Supplementary Note 13)

The computer readable recording medium according to Supplementary note 12, wherein the computer is mounted in a vehicle, and in the (c) step, the position coordinates of the object in the normalized image are transformed to coordinates in a coordinate system that provides position coordinates with a distance of the object to the vehicle and a tilt angle of the object relative to an optical axis of the imaging device, and a positional relationship between the object and the vehicle is determined based on a time-series change in the transformed position coordinates of the object.

(Supplementary Note 14)

The computer readable recording medium according to the supplementary note 13, wherein, in the (c) step, a rate of change in the distance of the object to the vehicle and a rate of change in the tilt angle of the object are obtained based on the transformed position coordinates of the object, and it is determined whether the object is in a state of moving around toward the vehicle, a state of crossing in front of the vehicle, or a state of approaching the vehicle, based on the obtained rate of change in the distance of the object to the vehicle and the obtained rate of change in the tilt angle of the object.

(Supplementary Note 15)

The computer readable recording medium according to Supplementary note 13 or 14, wherein, in the (c) step, the position coordinates of the object in the normalized image are transformed, using a reference table that is created in advance, to coordinates in a coordinate system that provides position coordinates with a distance of the object to the vehicle and the tilt angle of the object relative to the optical axis of the imaging device, and coordinates in the vertical direction and the horizontal direction in the normalized image, and the distance and the tilt angle that correspond to the coordinates are registered in association with each other in the reference table.

The invention of the present application has been described above with reference to the example embodiments, but the invention of the present application is not limited to the above example embodiments. The configurations and the details of the invention of the present application can be changed in various manners that can be understood by a person skilled in the art within the scope of the invention of the present application.

INDUSTRIAL APPLICABILITY

As described above, according to the invention, object detection accuracy can be improved in the case of using a fish-eye optical system. The invention is useful in a field where object detection is performed using a fish-eye camera, e.g. in an in-vehicle object detection system.

DESCRIPTIONS OF REFERENCE SIGNS

10 Normalized image acquisition unit
11 Fish-eye image acquisition unit
12 Viewpoint compensation vector acquisition unit
13 Image generating unit 14 Viewpoint compensation vector generating unit
20 Position detecting unit
30 Determination unit
100 Object detection apparatus
110 Computer
111 CPU
112 Main memory
113 Storage device
114 Input interface
115 Display controller
116 Data reader/writer
117 Communication interface
118 Input device
119 Display device
120 Recording medium
121 Bus
200 Image output device
300 Sensor device

What is claimed is:

1. An object detection apparatus for detecting an object in a fish-eye image, the apparatus comprising:
a normalized image acquisition unit configured to acquire a normalized image obtained by normalizing the fish-eye image in which the object appears;
a position detecting unit configured to detect position coordinates of the object in the normalized image; and
a determination unit configured to determine a positional relationship between the object and the apparatus, using the position coordinates of the object in the normalized image,
wherein the normalized image acquisition unit comprises:
a fish-eye image acquisition unit configured to acquire the fish-eye image;
a viewpoint compensation vector acquisition unit configured to acquire a viewpoint compensation vector for transforming the fish-eye image to an image obtained by shooting the object from a direction parallel to a ground plane of the object, based on a roll angle of an imaging device around an optical axis thereof and a pitch angle of the optical axis, with a plane parallel to the ground plane of the object serving as a reference; and
an image generating unit configured to set, for the fish-eye image transformed using the viewpoint compensation vector, a plurality of viewpoints parallel to the ground plane along a horizontal direction of the fish-eye image, perform, for each of the set viewpoints, distortion correction using perspective projection approximation for the transformed fish-eye image, based on a coordinate system that includes a line of sight from the viewpoint as an axis, and generate the normalized image using image elements in a vertical direction that are extracted from each of the corrected fish-eye images.

2. The object detection apparatus according to claim 1, wherein the object detection apparatus is mounted in a vehicle, and
the determination unit transforms the position coordinates of the object in the normalized image to coordinates in a coordinate system that provides position coordinates with a distance of the object to the vehicle and a tilt angle of the object relative to an optical axis of the imaging device, and determines a positional relationship between the object and the vehicle based on a time-series change in the transformed position coordinates of the object.

3. The object detection apparatus according to claim 2, wherein the determination unit obtains a rate of change in the distance of the object to the vehicle and a rate of change in the tilt angle of the object, based on the transformed position coordinates of the object, and determines whether the object is in a state of moving around toward the vehicle, a state of crossing in front of the vehicle, or a state of approaching the vehicle, based on the obtained rate of change in the distance of the object to the vehicle and the obtained rate of change in the tilt angle of the object.

4. The object detection apparatus according to claim 2, wherein the determination unit transforms, using a reference table that is created in advance, the position coordinates of the object in the normalized image to coordinates in a coordinate system that provides position coordinates with a distance of the object to the vehicle and the tilt angle of the object relative to the optical axis of the imaging device, and
coordinates in a vertical direction and a horizontal direction in the normalized image, and a distance and a tilt angle that correspond to the coordinates in the vertical direction and the horizontal direction in the normalized image are registered in association with each other in the reference table.

5. An object detection method for detecting an object in a fish-eye image, the method comprising:
(a) acquiring a normalized image obtained by normalizing the fish-eye image in which the object appears;
(b) detecting position coordinates of the object in the normalized image; and
(c) determining a positional relationship with the object, using the position coordinates of the object in the normalized image,
wherein the acquiring includes:
(a1) acquiring the fish-eye image;
(a2) acquiring a viewpoint compensation vector for transforming the fish-eye image to an image obtained by shooting the object from a direction parallel to a ground plane of the object, based on a roll angle of an imaging device around an optical axis thereof and a pitch angle of the optical axis, with a plane parallel to the ground plane of the object serving as a reference; and
(a3) setting, for the fish-eye image transformed using the viewpoint compensation vector, a plurality of viewpoints parallel to the ground plane along a horizontal direction of the fish-eye image, performing, for each of the set viewpoints, distortion correction using perspective projection approximation for the transformed fish-eye image, based on a coordinate system that includes a line of sight from the viewpoint as an axis, and generating the normalized image using image elements in a vertical direction that are extracted from each of the corrected fish-eye images.

6. The object detection method according to claim 5, wherein the object detection method is performed in a vehicle, and
in the (c), the position coordinates of the object in the normalized image are transformed to coordinates in a coordinate system that provides position coordinates with a distance of the object to the vehicle and a tilt angle of the object relative to an optical axis of the imaging device, and a positional relationship between the object and the vehicle is determined based on a time-series change in the transformed position coordinates of the object.

7. The object detection method claim 6,
wherein, in the (c), a rate of change in the distance of the object to the vehicle and a rate of change in the tilt angle of the object are obtained based on the transformed position coordinates of the object, and it is determined whether the object is in a state of moving around toward the vehicle, a state of crossing in front of the vehicle, or a state of approaching the vehicle, based on the obtained rate of change in the distance of the object to the vehicle and the obtained rate of change in the tilt angle of the object.

8. The object detection method according to claim 6,
wherein, in the (c), the position coordinates of the object in the normalized image are transformed, using a reference table that is created in advance, to coordinates in a coordinate system that provides position coordinates with a distance of the object to the vehicle and the tilt angle of the object relative to the optical axis of the imaging device, and coordinates in a vertical direction and a horizontal direction in the normalized image, and a distance and a tilt angle that correspond to the coordinates in the vertical direction and the horizontal direction in the normalized image are registered in association with each other in the reference table.

9. A non-transitory computer readable recording medium that includes a program recorded thereon, the program being for detecting an object in a fish-eye image using a computer and including instructions that cause the computer to carry out:
  (a) a step of acquiring a normalized image obtained by normalizing the fish-eye image in which the object appears;
  (b) a step of detecting position coordinates of the object in the normalized image; and
  (c) a step of determining a positional relationship with the object, using the position coordinates of the object in the normalized image,
  wherein the step of acquiring includes:
    (a1) a step of acquiring the fish-eye image;
    (a2) a step of acquiring a viewpoint compensation vector for transforming the fish-eye image to an image obtained by shooting the object from a direction parallel to a ground plane of the object, based on a roll angle of an imaging device around an optical axis thereof and a pitch angle of the optical axis, with a plane parallel to the ground plane of the object serving as a reference; and
    (a3) a step of setting, for the fish-eye image transformed using the viewpoint compensation vector, a plurality of viewpoints parallel to the ground plane along a horizontal direction of the fish-eye image, performing, for each of the set viewpoints, distortion correction using perspective projection approximation for the transformed fish-eye image, based on a coordinate system that includes a line of sight from the viewpoint as an axis, and generating the normalized image using image elements in a vertical direction that are extracted from each of the corrected fish-eye images.

10. The non-transitory computer readable recording medium according to claim 9,
wherein the computer is mounted in a vehicle, and
in the (c) step, the position coordinates of the object in the normalized image are transformed to coordinates in a coordinate system that provides position coordinates with a distance of the object to the vehicle and a tilt angle of the object relative to an optical axis of the imaging device, and a positional relationship between the object and the vehicle is determined based on a time-series change in the transformed position coordinates of the object.

11. The non-transitory computer readable recording medium according to claim 10,
wherein, in the (c) step, a rate of change in the distance of the object to the vehicle and a rate of change in the tilt angle of the object are obtained based on the transformed position coordinates of the object, and it is determined whether the object is in a state of moving around toward the vehicle, a state of crossing in front of the vehicle, or a state of approaching the vehicle, based on the obtained rate of change in the distance of the object to the vehicle and the obtained rate of change in the tilt angle of the object.

12. The computer readable recording medium according to claim 10,
wherein, in the (c) step, the position coordinates of the object in the normalized image are transformed, using a reference table that is created in advance, to coordinates in a coordinate system that provides position coordinates with a distance of the object to the vehicle and the tilt angle of the object relative to the optical axis of the imaging device, and coordinates in a vertical direction and a horizontal direction in the normalized image, and a distance and a tilt angle that correspond to the coordinates in the vertical direction and the horizontal direction in the normalized image are registered in association with each other in the reference table.

* * * * *